United States Patent
Sakikawa et al.

(10) Patent No.: US 11,383,201 B2
(45) Date of Patent: Jul. 12, 2022

(54) HUMIDITY CONTROLLER

(71) Applicant: SHARP KABUSHIKI KAISHA, Sakai (JP)

(72) Inventors: Nobuki Sakikawa, Sakai (JP); Hiroaki Okano, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 279 days.

(21) Appl. No.: 16/639,479

(22) PCT Filed: Jan. 11, 2018

(86) PCT No.: PCT/JP2018/000444
§ 371 (c)(1),
(2) Date: Feb. 14, 2020

(87) PCT Pub. No.: WO2019/043975
PCT Pub. Date: Mar. 7, 2019

(65) Prior Publication Data
US 2021/0129075 A1   May 6, 2021

(30) Foreign Application Priority Data

Sep. 4, 2017  (JP) .............................. JP2017-169553

(51) Int. Cl.
*B01D 53/26* (2006.01)
*F24F 3/14* (2006.01)
(Continued)

(52) U.S. Cl.
CPC ....... *B01D 53/261* (2013.01); *B01D 53/0438* (2013.01); *B01D 53/28* (2013.01);
(Continued)

(58) Field of Classification Search
CPC .. B01D 53/261; B01D 53/28; B01D 53/0438; B01D 2253/11; B01D 2253/202;
(Continued)

(56) References Cited

U.S. PATENT DOCUMENTS 4,594,860 A * 6/1986 Goellner ............... F24F 3/1423
                                                165/10
5,147,420 A * 9/1992 Claesson ............. B01D 53/261
                                                95/113
(Continued)

FOREIGN PATENT DOCUMENTS

JP   H06-055070 A   3/1994
JP   2000-126540 A   5/2000
(Continued)

OTHER PUBLICATIONS

Co-Pending letter regarding a related co-pending U.S. Appl. No. 16/640,519, filed Feb. 20, 2020.

*Primary Examiner* — Frank M Lawrence, Jr.
(74) *Attorney, Agent, or Firm* — ScienBiziP, P.C.

(57) ABSTRACT

To reduce loss due to water evaporation and to efficiently release moisture from a moisture absorbing portion, in the humidity controller according to the present invention, a moisture absorbing portion (2) is formed to include at least two gel sections each with a different thermal conductivity and to release absorbed moisture from an exposed surface (31) that is a specific region exposed outside and that is disposed on the surface opposite to a heater (5) on the basis of heating by the heater (5).

7 Claims, 15 Drawing Sheets

(51) Int. Cl.
  *B01D 53/04* (2006.01)
  *B01D 53/28* (2006.01)
  *B01J 20/12* (2006.01)
  *B01J 20/26* (2006.01)
  *B01J 20/28* (2006.01)
  *B01J 20/34* (2006.01)

(52) U.S. Cl.
  CPC ............... *B01J 20/12* (2013.01); *B01J 20/26* (2013.01); *B01J 20/28011* (2013.01); *B01J 20/28047* (2013.01); *B01J 20/3425* (2013.01); *B01J 20/3483* (2013.01); *F24F 3/14* (2013.01); *B01D 2253/11* (2013.01); *B01D 2253/202* (2013.01); *B01D 2257/80* (2013.01); *B01D 2259/402* (2013.01); *B01D 2259/40096* (2013.01)

(58) Field of Classification Search
  CPC ...... B01D 2257/80; B01D 2259/40096; B01D 2259/402; B01D 2259/4508; B01J 20/12; B01J 20/26; B01J 20/28011; B01J 20/28047; B01J 20/3425; B01J 20/3483; B01J 20/28; F24F 3/14; F24F 3/1423; F24F 2003/144; F24F 2003/1458
  USPC ....... 34/80, 472, 473; 96/108, 121, 125, 126
  See application file for complete search history.

(56) References Cited

U.S. PATENT DOCUMENTS

| | | | |
|---|---|---|---|
| 5,534,186 A * | 7/1996 | Walker | B01D 53/261 252/194 |
| 6,526,674 B1 * | 3/2003 | Fielding | B01D 53/0446 34/130 |
| 7,704,305 B2 * | 4/2010 | Nishida | F28F 13/18 96/154 |
| 10,265,656 B2 * | 4/2019 | Sakikawa | F24F 3/1429 |
| 2009/0121196 A1 | 5/2009 | El Bounia | |
| 2011/0040007 A1 | 2/2011 | Chandrasekhar et al. | |
| 2013/0309927 A1 | 11/2013 | Jangbarwala | |
| 2017/0001492 A1 | 1/2017 | Ito et al. | |
| 2017/0065930 A1 | 3/2017 | Sakikawa et al. | |
| 2017/0266610 A1 | 9/2017 | Sakikawa et al. | |
| 2017/0276380 A1 | 9/2017 | Sakikawa et al. | |

FOREIGN PATENT DOCUMENTS

| | | |
|---|---|---|
| JP | 2000-142816 A | 5/2000 |
| JP | 2008-527064 A | 7/2008 |
| JP | 2009189900 A | 8/2009 |
| JP | 2010-069428 A | 4/2010 |
| JP | 2011-038078 A | 2/2011 |
| JP | 2015-111629 A | 6/2015 |
| JP | 2016-077967 A | 5/2016 |
| JP | 2016-113651 A | 6/2016 |
| WO | 2015/083732 A1 | 6/2015 |
| WO | 2015/083733 A1 | 6/2015 |
| WO | 2016/035403 A1 | 3/2016 |
| WO | 2016/068129 A1 | 5/2016 |

* cited by examiner

HUMIDITY CONTROLLER

TECHNICAL FIELD

The present invention relates to a humidity controller.

BACKGROUND ART

To date, humidity controllers including a moisture absorbent containing a stimuli-responsive polymer have been known as humidity controllers for adjusting the humidity in the air.

For example, PTL 1 discloses a technology in which a composite porous fibrous dehumidifying material is used in air conditioning/climate control units. The composite porous fibrous dehumidifying material is composed of a plurality of fibers, on the surface of which a reversible hydrogel material is immobilized. Phase change of the reversible hydrogel material is caused by stimuli, for example, temperature change, pH change, electric field, or intensity or wavelength of light, and absorbed water is released. According to the technology described in PTL 1, such a composite porous fibrous dehumidifying material is exploited for dehumidifiers.

CITATION LIST

Patent Literature

PTL 1: U.S. Patent Application Publication No. 2013/309927 (published on Nov. 21, 2013)

SUMMARY OF INVENTION

Technical Problem

However, the technology described in PTL 1 has a problem in that control of the thermal conductivity in the reversible hydrogel material of the composite porous fibrous dehumidifying material is difficult. Consequently, for example, when the composite porous fibrous dehumidifying material is heated, since the heat is conducted at a speed higher than the speed of water being released to an exposed surface, the heat is conducted before the water to be released reaches the exposed surface. As a result, regarding the reversible hydrogel material, a skin layer that has been changed to be hydrophobic is formed on the surface exposed outside, and the water is confined inside. In this case, most of the moisture absorbed into the composite porous fibrous dehumidifying material is not released as water drops from the exposed surface due to the skin layer and is lost as water vapor. Consequently, a degraded dehumidifying effect due to water vapor being released is a concern.

It is an object of an aspect of the present invention to provide a humidity controller that can reduce loss due to water evaporation and that can release moisture from a moisture absorbing portion.

Solution to Problem

To address the above-described problems, a humidity controller according to the present invention includes a moisture absorbing portion having a moisture absorbent containing a stimuli-responsive polymer with water affinity that changes reversibly in response to temperature stimuli and includes a stimuli-providing portion that provides temperature stimuli to degrade water affinity of the moisture absorbent, wherein the moisture absorbing portion is formed to include at least two gel sections each with a different thermal conductivity and to release absorbed moisture from a specific region that is exposed outside and that is disposed on the surface opposite to the stimuli-providing portion in accordance with the temperature stimuli.

Advantageous Effects of Invention

According to an aspect of the present invention, an effect of reducing loss due to water evaporation and an effect of efficiently releasing moisture from a moisture absorbing portion can be exerted.

BRIEF DESCRIPTION OF DRAWINGS

FIG. 13(a) is a sectional view, and FIG. 13(b) is a sectional view cut along line A-A in FIG. 13(a).

DESCRIPTION OF EMBODIMENTS

First Embodiment

Figure 1:
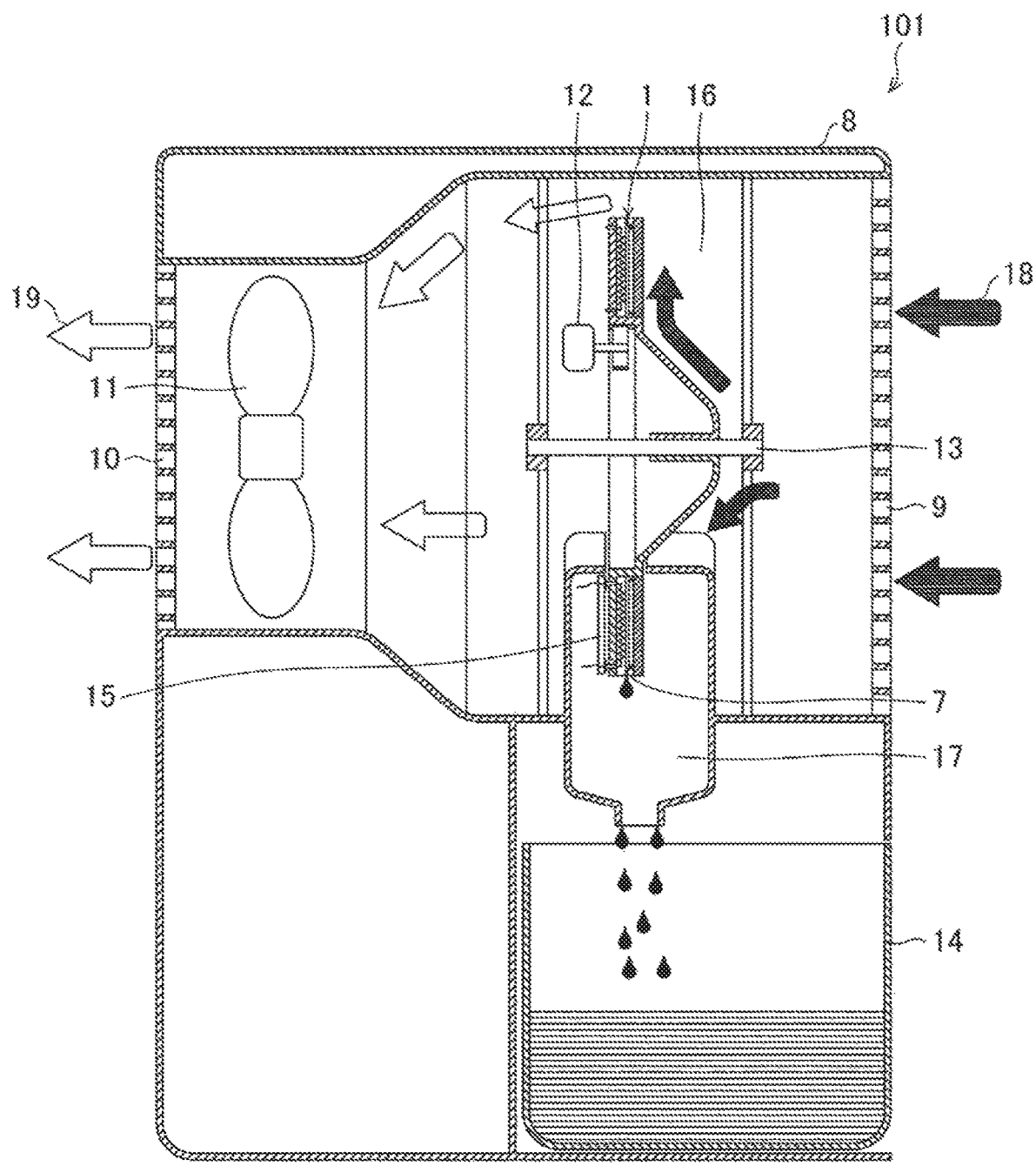
FIG. 1 is a vertical sectional view showing the configuration of a humidity controller according to a first embodiment of the present invention.
Figure 2:
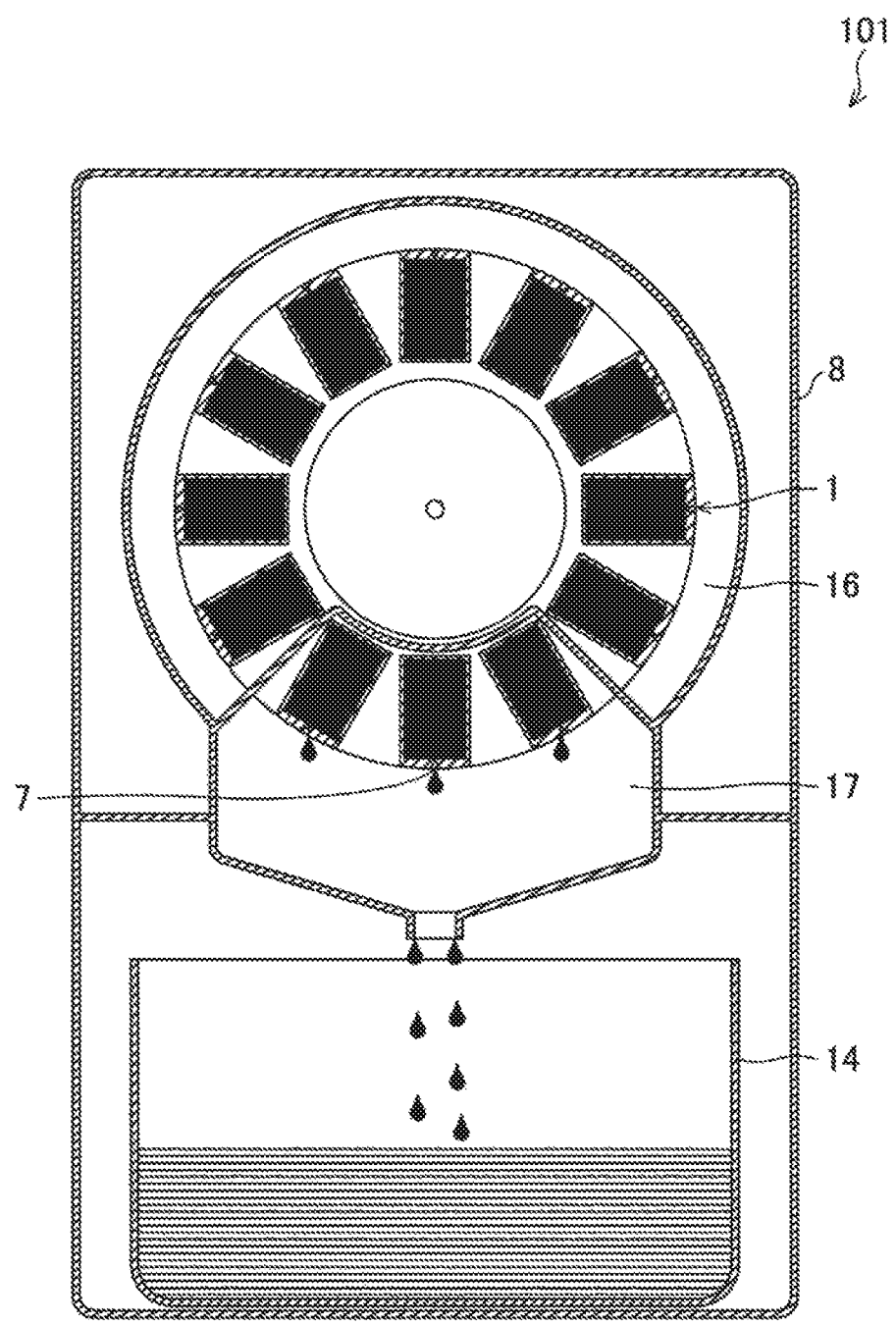
FIG. 2 is a horizontal sectional view showing the configuration of the humidity controller according to the first embodiment of the present invention.

An embodiment according to the present invention will be described. FIG. 1 is a vertical sectional view showing the configuration of a humidity controller 101 according to the present embodiment. FIG. 2 is a horizontal sectional view showing the configuration of the humidity controller 101.

As shown in FIG. 1 and FIG. 2, the humidity controller 101 includes an apparatus main body 8 having air intake ports 9 and air exhaust ports 10. Moisture absorbing units 1, a moisture absorption area 16, a dehydration area 17, a drain tank 14, and a blower fan 11 are included inside the apparatus main body 8. The moisture absorption area 16 is the region in which the moisture absorbing units 1 absorb moisture from the air. The dehydration area 17 is the region in which the moisture absorbing units 1 that have absorbed moisture from the air release the resulting moisture as water. The drain tank 14 is a tank that stores water released from the dehydration area 17. The blower fan 11 is a fan that takes in air to be dehumidified through the air intake ports 9 and that discharges the dehumidified air through the air exhaust ports 10.

The air intake ports 9 are formed in one side surface of the apparatus main body 8, and the air exhaust ports 10 are formed in the side surface opposite to the one side surface. Consequently, the air taken in through the air intake ports 9 flows in the horizontal direction in the apparatus main body 8. Meanwhile, the moisture absorption area 16 and the dehydration area 17 are arranged nearer to the air intake ports 9 in the flow path of the air taken in through the air intake ports 9, and the blower fan 11 is arranged nearer to the air exhaust ports 10 in the flow path of the air taken in through the air intake ports 9. The drain tank 14 is disposed below the dehydration area 17.

The moisture absorbing units 1 are arranged between the air intake ports 9 and the air exhaust ports 10 and, as shown in FIG. 2, are radially arranged with a spacing therebetween on the circumference of the circle centered about a unit rotation shaft 13 in a plane parallel to the side surface having the air intake ports 9 of the apparatus main body 8 and parallel to the side surface having the air exhaust ports 10 of the apparatus main body 8. In this regard, a plurality of moisture absorbing units 1 are rotatable about the unit rotation shaft 13. The rotation of the unit rotation shaft 13 is driven by a unit rotation motor 12.

The region in which the moisture absorbing units 1 rotate about the unit rotation shaft 13 is divided into the moisture absorption area 16 disposed as the upper part and the dehydration area 17 disposed as the lower part. The moisture absorbing units 1 are moved between the moisture absorption area 16 and the dehydration area 17 by rotation. The air taken in through the air intake ports 9 is allowed to pass through the moisture absorption area 16 and is not allowed to flow into the dehydration area 17. In the dehydration area 17, a fixed electrode 15 for a heater is disposed so as to energize a heater electrode of the heater 5 of the moisture absorbing unit 1.

The moisture absorbing unit 1 is an element assembly including a moisture absorbing portion 2 having a moisture absorbent and the heater 5. Regarding the moisture absorbent constituting the moisture absorbing portion 2, a moisture absorbent containing a dry body of a stimuli-responsive polymer with water affinity that switches reversibly between hydrophilicity and hydrophobicity in response to external stimuli may be used. In this regard, in the present embodiment, the configuration in which a temperature-responsive polymer (heat-responsive polymer) with water affinity that changes reversibly in response to heat is used will be described. Such a temperature-responsive polymer is a polymer having a lower critical solution temperature (LCST, hereafter also referred to as "LCST" in the present specification). The polymer having a LCST is hydrophilic at low temperature and is hydrophobic the LCST or higher. In this regard, when a polymer is dissolved in water, the LCST is denoted as the boundary temperature in the case in which the polymer is hydrophilic and is dissolved in water at low temperature but becomes hydrophobic and insoluble at a certain temperature or higher. The temperature-responsive polymer can reversibly perform absorption of moisture from the air and release of the absorbed moisture on the basis of a change in temperature by using a simple heating device and, therefore, can be particularly favorably used for a humidity controller. Meanwhile, it is preferable that the moisture absorbent constituting the moisture absorbing portion 2 contain a stimuli-responsive polymer and a hydrophilic polymer. In this regard, specific examples of the moisture absorbent used in the moisture absorbing portion 2 will be described later.

When the humidity controller 101 is operated, the moisture absorbing unit 1 is rotated about the unit rotation shaft 13 by the unit rotation motor 12. In addition, the blower fan 11 is driven, and in the flow path of the air in the apparatus main body 8, air to be dehumidified (wet air) 18 is taken into the apparatus main body 8 through the air intake ports 9.

The air (wet air) 18 suctioned into the apparatus main body 8 comes into contact with the moisture absorbing portion 2 of the moisture absorbing unit 1 while passing through the moisture absorption area 16. The moisture absorbent, with which the moisture absorbing portion 2 is filled, is hydrophilic at room temperature and absorbs moisture from the air (wet air). Consequently, the wet air is dehumidified while passing through the moisture absorption area 16, and toe dehumidified air (dry air) 19 is discharged through the air exhaust ports 10.

The moisture absorbing unit 1 that has absorbed moisture from the air (wet air) is rotated about the unit rotation shaft 13 by rotation of the unit rotation shaft 13 and is moved from the moisture absorption area 16 to inside the dehydration area 17. In the dehydration area 17, the heater electrode of the heater 5 of the moisture absorbing unit 1 is energized by coming into contact with the fixed electrode 15 for a heater, and, thereby, the moisture absorbing unit 1 moved to the dehydration area 17 is heated by the heater 5. The temperature of the moisture absorbing portion 2 is increased to the LCST or higher by the moisture absorbing portion 2 being heated by the heater 5, and the moisture absorbent, with which the moisture absorbing portion 2 is filled, becomes hydrophobic. As a result, moisture absorbed by the moisture absorbent is released as water from the moisture absorbent. The released water is discharged from a dripping port 7 into the drain tank 14.

As described above, the humidity controller 101 according to the present embodiment includes a moisture absorbing portion 2 having a moisture absorbent containing a temperature-responsive polymer (stimuli-responsive polymer) with water affinity that switches reversibly between hydrophilicity and hydrophobicity in response to temperature (external stimuli) and includes a heater (stimuli-providing portion) 5 that heats the moisture absorbent including water due to moisture absorption so as to release the absorbed moisture by altering the moisture absorbent to have hydrophobicity. Consequently, the absorbed moisture can be directly extracted in a liquid state without the need for a heat-exchanger. Further, using a responsive polymer having a LCST of a temperature that is slightly higher than room temperature as the moisture absorbent, with which the moisture absorbing portion 2 is filled, enables the absorbed moisture to be directly extracted in a liquid state by only heating the moisture absorbent to a temperature higher than or equal to the LCST without exploiting supercooling or a large amount of heat. The LCST of the responsive polymer used is a relatively low temperature of, for example, 40° C. or higher. The temperature is, for example, 40° C. to 100° C., and more preferably 40° C. to 70° C.

The configuration of the humidity controller 101 is not limited to the configuration shown in FIGS. 1 and 2 and may be a known configuration in which humidity can be controlled by using a moisture absorbent containing a temperature-responsive polymer (stimuli-responsive polymer). For example, in the configuration shown in FIGS. 1 and 2, the air intake ports 9 may be formed in the lower part of one side surface of the apparatus main body 8, and the air exhaust ports 10 may be formed in the upper surface of the apparatus main body 8. In this case, it is preferable that a plurality of moisture absorbing units 1 be arranged on a surface corresponding to the side surface of a circular cylinder in which the center axis is the unit rotation shaft 13 extending in the vertical direction in the apparatus main body 8.

Further, modified examples 1 to 3 of the humidity controller 101 will be described with reference to FIGS. 3 to 10.

Modified Example 1

Figure 3:
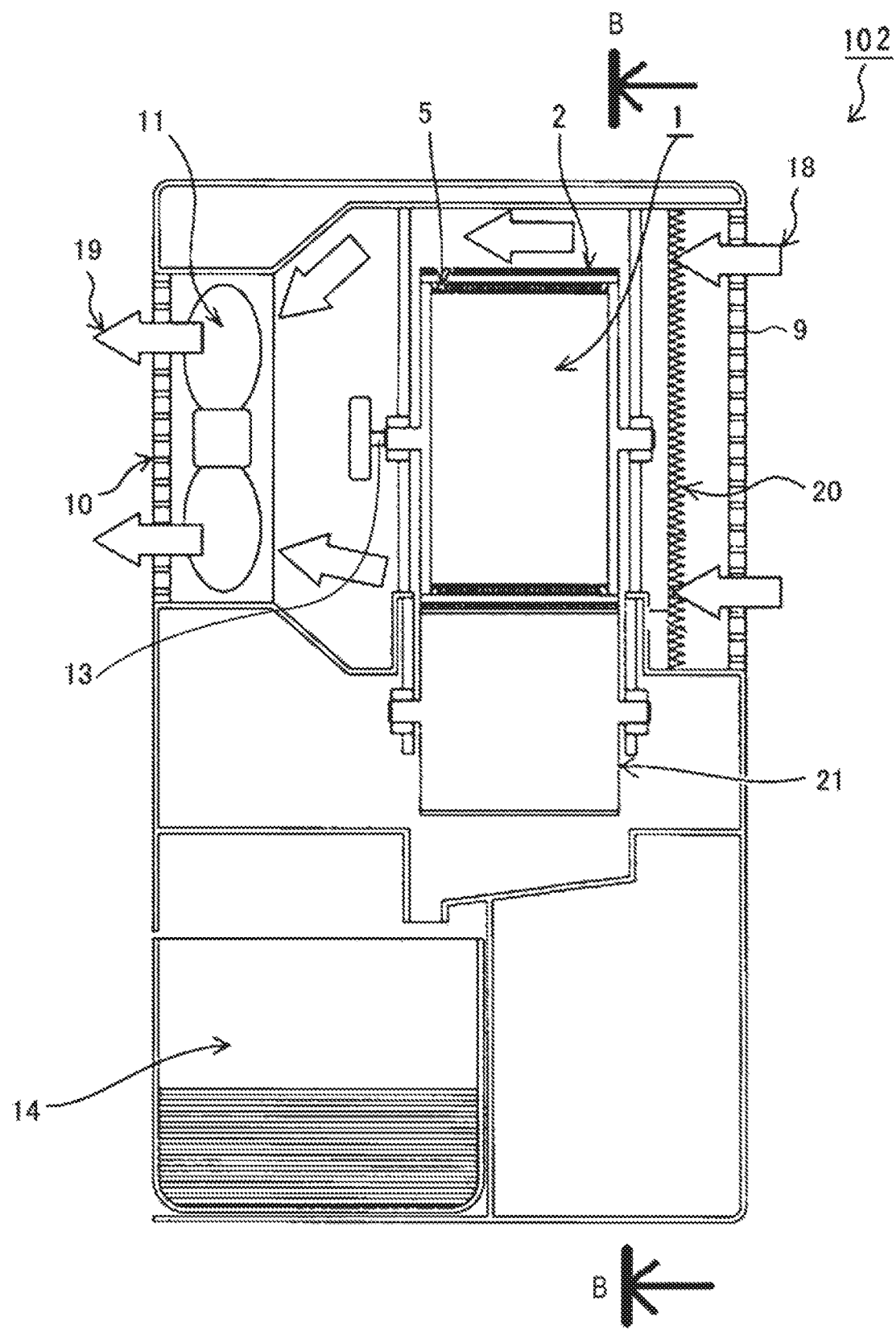
FIG. 3 is a vertical sectional view showing the configuration of a humidity controller of modified example 1.
Figure 4:
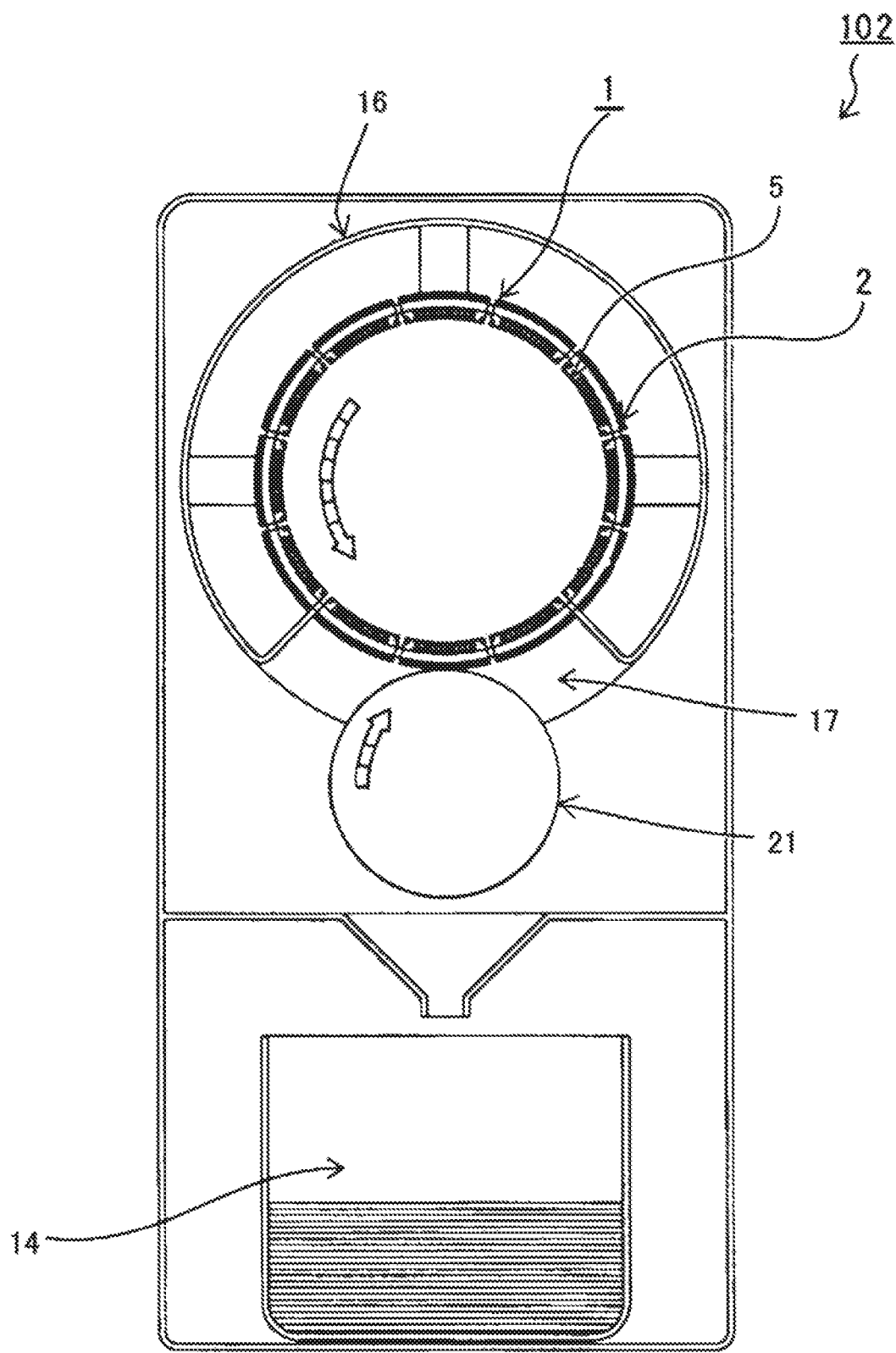
FIG. 4 is a sectional view showing the configuration of the humidity controller cut along line B-B in FIG. 3.

FIG. 3 is a vertical sectional view of a humidity controller 102 that is modified example 1, and FIG. 4 is a sectional view showing the humidity controller 102 cut along line B-B in FIG. 3.

An air flow path of the humidity controller 102 includes air intake ports 9, an intake air filter 20, moisture absorbing units 1, a blower fan 11, and air exhaust ports 10 in order from the air inlet side.

As shown in FIG. 3 and FIG. 4, in the moisture absorbing units 1, elements having a multilayer structure including a moisture absorbing portion 2 and a heater 5 are fixed on the side surface of a circular cylinder. The circular cylinder is a circular cylinder in which the center axis is a unit rotation shaft 13 extending in the direction perpendicular to the side surface of the casing having the air intake ports 9 in the humidity controller 102. The elements of the respective moisture absorbing units 1 are arranged on the side surface of the circular cylinder so as to adjoin each other by regular intervals.

The moisture absorbing units 1 are rotatable about the unit rotation shaft 13 in the direction indicated by the arrow (counterclockwise) in FIG. 4. The rotation of the moisture absorbing unit 1 is driven by a stepping motor so as to rotate for a predetermined time. The moisture absorbing units 1 may be controlled such that rotational movement from the moisture absorption area 16 to the dehydration area 17 is performed on an element basis at predetermined intervals or such that rotational movement from the moisture absorption area 16 to the dehydration area 17 is performed by slow continuous rotation. The predetermined interval differs in accordance with moisture absorption-release characteristics of the polymeric moisture absorbent and is determined appropriately.

In modified example 1, the cross section of each moisture absorbing unit 1 has an arc shape such that a cylindrical shape is formed as a whole when the moisture absorbing units 1 are arranged close to each other on the side surface of the circular cylinder. That is, each of the moisture absorbing portion 2 and the heater 5 has a plate-like shape with a cross-sectional shape curved like an arc. At this time, each moisture absorbing unit 1 is arranged while the moisture absorbing portion 2 is arranged as an outer part of the arc, and the heater 5 is arranged as an inner part of the arc.

As shown in FIG. 4, the region in which the moisture absorbing units 1 rotate is divided into the moisture absorption area 16 disposed as the upper part of the humidity controller 102 and the dehydration area 17 disposed as the lower part of the humidity controller 102. In this regard, when the moisture absorbing units 1 rotate once by a predetermined interval, one element is moved from the moisture absorption area 16 to the dehydration area 17, and one element is moved from the dehydration area 17 to the moisture absorption area 16. In the present embodiment, three moisture absorbing units 1 located in the lower part of the humidity controller 102 are in the dehydration area 17.

In the dehydration area 17, a fixed electrode for a heater (not shown in the drawing) is disposed at a position at which it is possible for the fixed electrode for a heater to come into contact with a heater electrode of the heater 5 of the moisture absorbing unit 1 in the dehydration area 17 and to energize the heater 5. Consequently, when each moisture absorbing unit 1 reaches the dehydration area 17, the heater 5 of each moisture absorbing unit 1 is actuated by being energized.

In the dehydration area 17, a transfer portion 21 is further disposed under the moisture absorbing unit 1 so as to be in contact with the moisture absorbing unit 1. The transfer portion 21 is a member having a cylindrical shape. The transfer portion 21 is disposed in the state in which the surface of the moisture absorbing portion 2 is in contact with the surface of the transfer portion 21, and rotation is transmitted by rotation of the moisture absorbing unit 1.

When the moisture absorbing unit 1 is moved to the dehydration area 17 by rotation, the moisture absorbing portion 2 is heated to the LCST or higher by the heater 5. Consequently, water drops ooze from the moisture absorbing portion 2, and the water drops are transferred to the transfer portion 21.

Meanwhile, the air taken in through the air intake ports 9 passes through the moisture absorption area 16 only and is not distributed into the dehydration area 17 due to an air distribution wall.

A dripping port is disposed under the dehydration area 17, and a drain tank 14 is disposed under the dripping port. The drain tank 14 can be drawn out in the direction of exhaust air to discharge accumulated water.

Next, a dehumidifying method using the humidity controller 102 will be described with reference to FIGS. 3 to 7. When the humidity controller 102 is operated, the blower fan 11 in the humidity controller 102 is actuated, and air (wet air 18) is taken into the humidity controller 102 from the air intake ports 9 through the intake air filter 20. The moisture absorbing unit 1 is driven by the stepping motor and is rotated about the unit rotation shaft 13 at a predetermined rotational speed.

The air (wet air) 18 taken into the humidity controller 102 comes into contact with the moisture absorbing portion 2 of the moisture absorbing unit 1 while passing through the moisture absorption area 16. In the moisture absorption area 16, since the heater 5 is not actuated, moisture from the air (wet air) 18 is absorbed at room temperature by the moisture absorbing portion 2 having hydrophilicity. Consequently, the wet air passing through the moisture absorption area 16 is dehumidified, and air (dry air) 19 after dehumidification is discharged through the air exhaust ports 10.

The moisture absorbing unit 1 that has absorbed moisture from the air (wet air) 18 is driven by the stepping motor and is rotated in the direction indicated by the arrow in the drawing so as to move successively from the moisture absorption area 16 into the dehydration area 17. In the dehydration area 17, the heater electrode of the heater 5 of each moisture absorbing unit 1 comes into contact with the fixed electrode for a heater (not shown in the drawing) so as to perform energization, and, thereby, the moisture absorbing portion 2 is heated by the heater 5.

The moisture absorbing portion 2 is heated by the heater 5. The temperature of the moisture absorbing portion 2 thereby becomes higher than or equal to the LCST, and the water affinity is degraded so as to realize hydrophobicity. As a result, the moisture absorbed by the moisture absorbing portion 2 is released as liquid water from the moisture absorbing portion 2.

Figure 5:
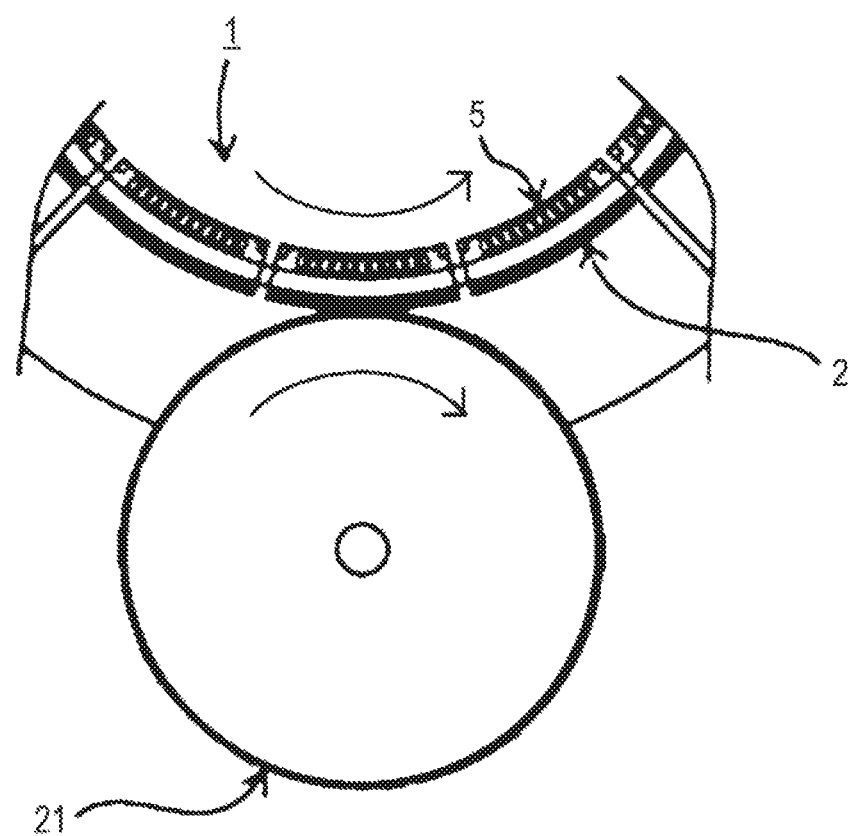
FIG. 5 is a diagram showing the status of an element moved to a dehydration area due to rotation of a moisture absorbing unit in modified example 1.
Figure 6:
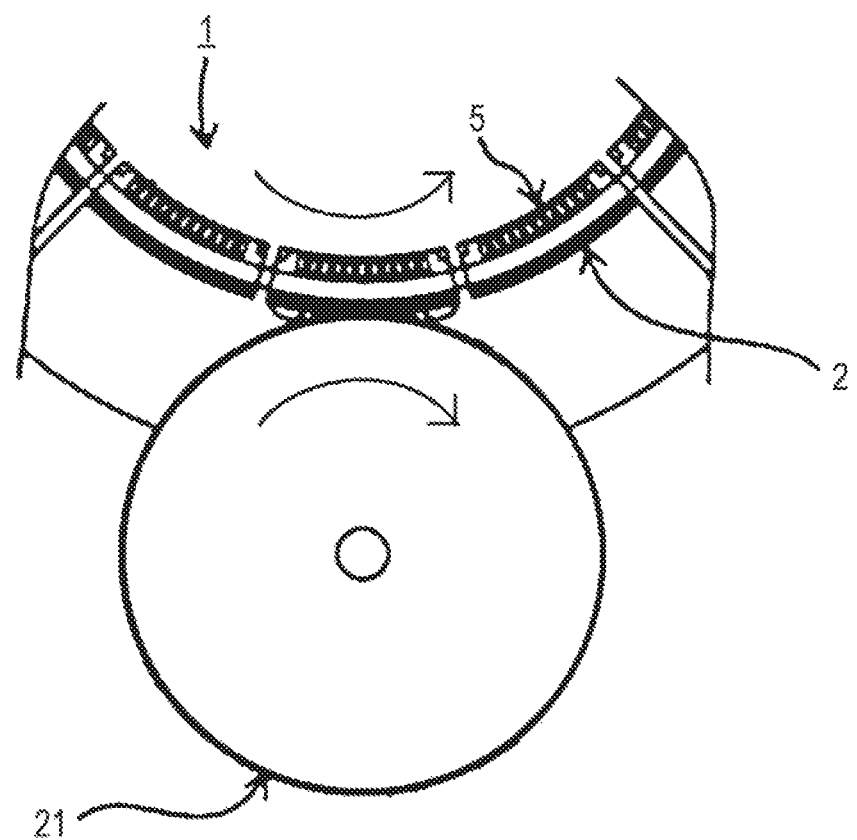
FIG. 6 is a diagram showing the status of the element which is moved to a dehydration area due to rotation of the moisture absorbing unit and from which water oozes by being heated thereafter in modified example 1.
Figure 7:
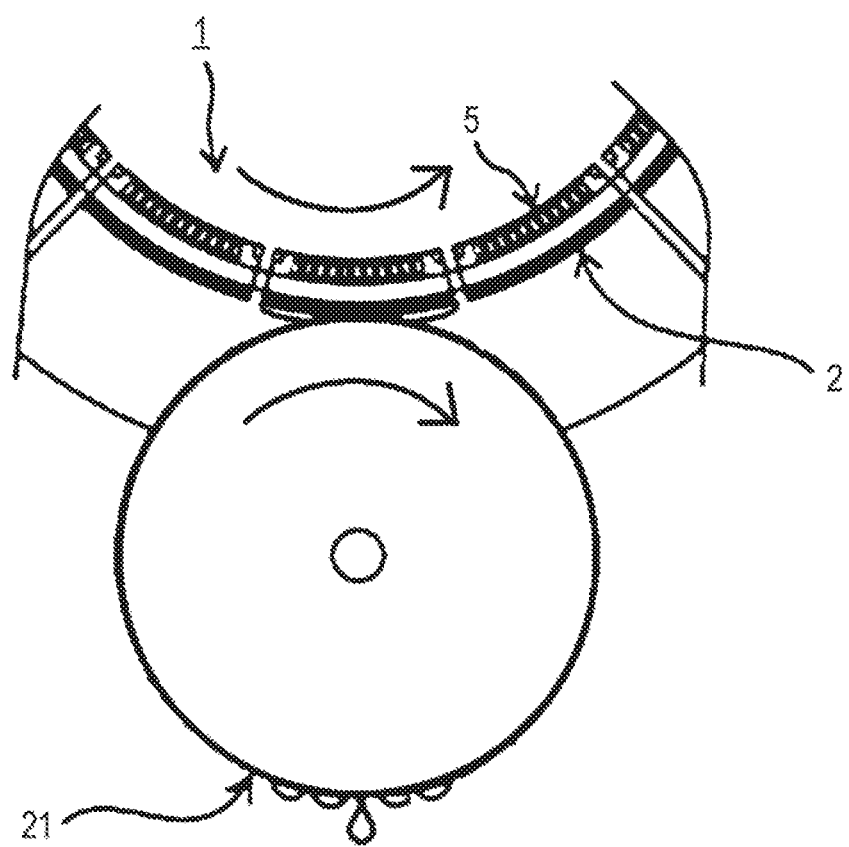
FIG. 7 is a diagram showing the status of the water released from the moisture absorbing unit is extracted to the surface of a cylindrical transfer portion in modified example 1.

FIG. 5 is a diagram showing the status of the element moved to the lowest portion due to rotation of the moisture absorbing unit 1. At this stage, water released from the moisture absorbing portion 2 has not yet been extracted onto the surface of the moisture absorbing portion 2. FIG. 6 is a diagram showing the status in which, after the element is moved to the lowest portion of the humidity controller 102 due to rotation of the moisture absorbing unit 1, water drops ooze from the moisture absorbing portion 2 and are in contact with the transfer portion 21. Further, FIG. 7 is a diagram showing the status in which the released water moves to the surface of the transfer portion 21 and water drops flow on the surface so as to drip downward. The thus drained water is accumulated as dripped water into the drain tank 14.

In modified example 1, the effect of allowing water to ooze by providing external stimuli to the polymeric moisture absorbent that has absorbed water from the air can be obtained in the same manner as in the configuration shown in FIG. 1 and FIG. 2. In addition, in the humidity controller 102 of modified example 1, bringing the transfer portion 21 into contact with the surface of the polymeric moisture absorbent (moisture absorbing portion 2) having degraded water affinity enables even a very small amount of water released from the moisture absorbing portion 2 to be extracted.

In the example shown in FIG. 3 and FIG. 4, the moisture absorbing unit 1 has a configuration in which the moisture absorbing portion 2 is arranged as an outer part of the arc, and the heater 5 is arranged as an inner part of the arc. However, in contrast to this arrangement, the moisture absorbing unit 1 may have a configuration in which the moisture absorbing portion 2 is arranged as an inner part of the arc, and the heater 5 is arranged as an outer part of the arc. In such a case, the fixed electrode for a heater is arranged outside the moisture absorbing unit 1.

In this regard, in modified example 1, three moisture absorbing units 1 located in the lower part of the humidity controller 102 are in the dehydration area 17. In the dehydration area 17, a fixed electrode for a heater (not shown in the drawing) is disposed at a position at which it is possible for the fixed electrode for a heater to come into contact with a heater electrode of each of the heater 5 of the moisture absorbing unit 1 immediately after moving into the dehydration area 17 and the heater 5 of the moisture absorbing unit 1 located at the lowest point in the dehydration area 17 so as to perform energization. It is preferable that energization of each element be finished before the moisture absorbing unit 1 is moved completely from the dehydration area 17 to the moisture absorption area 16 due to rotation.

Modified Example 2

Figure 8:
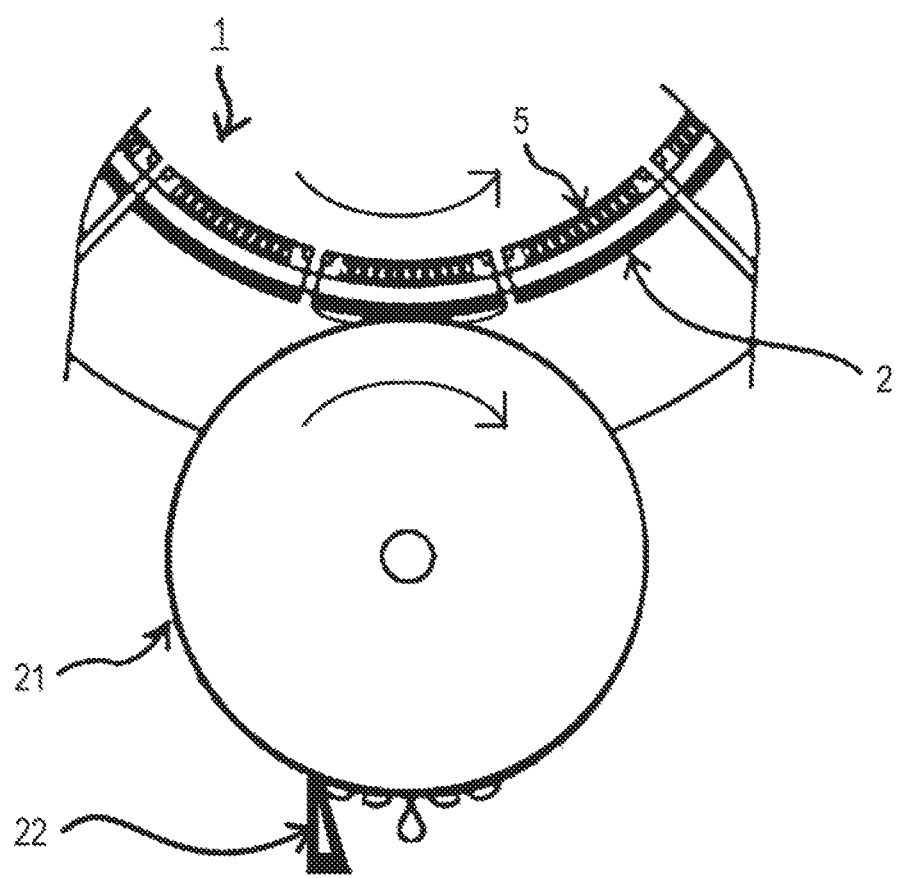
FIG. 8 is a diagram illustrating the action of a water-drop-removing portion in a humidity controller of modified example 2.

Modified example 2 corresponds to modified example 1 to which a water-drop-removing portion 22 is added. Other configurations and actions are the same as in modified example 1, and, therefore, explanations will be omitted. FIG. 8 is a diagram illustrating the action of the water-drop-removing portion 22 in a humidity controller of modified example 2.

As shown in FIG. 8, the water-drop-removing portion 22 is disposed under the transfer portion 21 so as to be in contact with the outer circumference. The moisture absorbing unit 1 and the transfer portion 21 are rotated in the respective direction indicated by the respective arrows in the drawing.

The moisture absorbing unit 1 that has absorbed moisture from the air is rotated, and the moisture absorbing unit 1 is moved into the dehydration area 17. Thereafter, the moisture absorbing portion 2 is heated by the heater 5 so as to release the water, and the water is extracted onto the surface of the transfer portion 21. Subsequently, the released water trickles downward on the surface of the transfer portion 21 so as to move to the lowest portion. Then, many water drops fall into the drain tank 14 so as to be accumulated. Water drops that do not drip at this time are forcedly removed from the surface of the transfer portion 21 by the water-drop-removing portion 22 and are accumulated into the drain tank 14.

In this manner, the moisture absorbing unit 1 is rotated, and, thereby, the water extracted from each element that is moved to the lowest portion of the circular cylinder constituting the moisture absorbing units 1 is successively moved into the drain tank 14 via the transfer portion 21. Consequently, absorption and release of moisture from the air by the moisture absorbing units 1 is successively repeated.

In modified example 2, the water-drop-removing portion 22 is disposed under the transfer portion 21 and at the position shifted backward in the rotational direction of the transfer portion 21 from the lowest point. However, as a matter of course, the position may be the lowest point or be shifted frontward in the rotational direction of the transfer portion 21. In the case of backward in the rotational direction, since the surface of the transfer portion 21 is moved so as to be separated in the rotational direction from the contact portion with the water-drop-removing portion 22, contact is performed smoothly.

The water-drop-removing portion 22 is a tabular or rod-like structure. However, there is no particular limitation regarding the shape provided that it is possible to come into contact with the surface of the transfer portion 21. Preferably, the water-drop-removing portion 22 is formed of a material having flexibility and no water absorbing property.

The water-drop-removing portion 22 may be arranged in no contact with the transfer portion 21. The water-drop-removing portion 22 may be disposed at any position in the vicinity of the circumferential portion of the transfer portion 21. Further, since the transfer portion 21 is rotated, there is no need to move the water-drop-removing portion 22, and the structure is more simplified.

In modified examples 1 or 2, a pattern that facilitates water removal may be disposed on the surface of the transfer portion 21. The pattern may be grooves formed by engraving the surface of the transfer portion 21 or ribs that protrude very slightly. There is no particular limitation regarding the shape provided that water removal can be facilitated.

Modified Example 3

Figure 9:
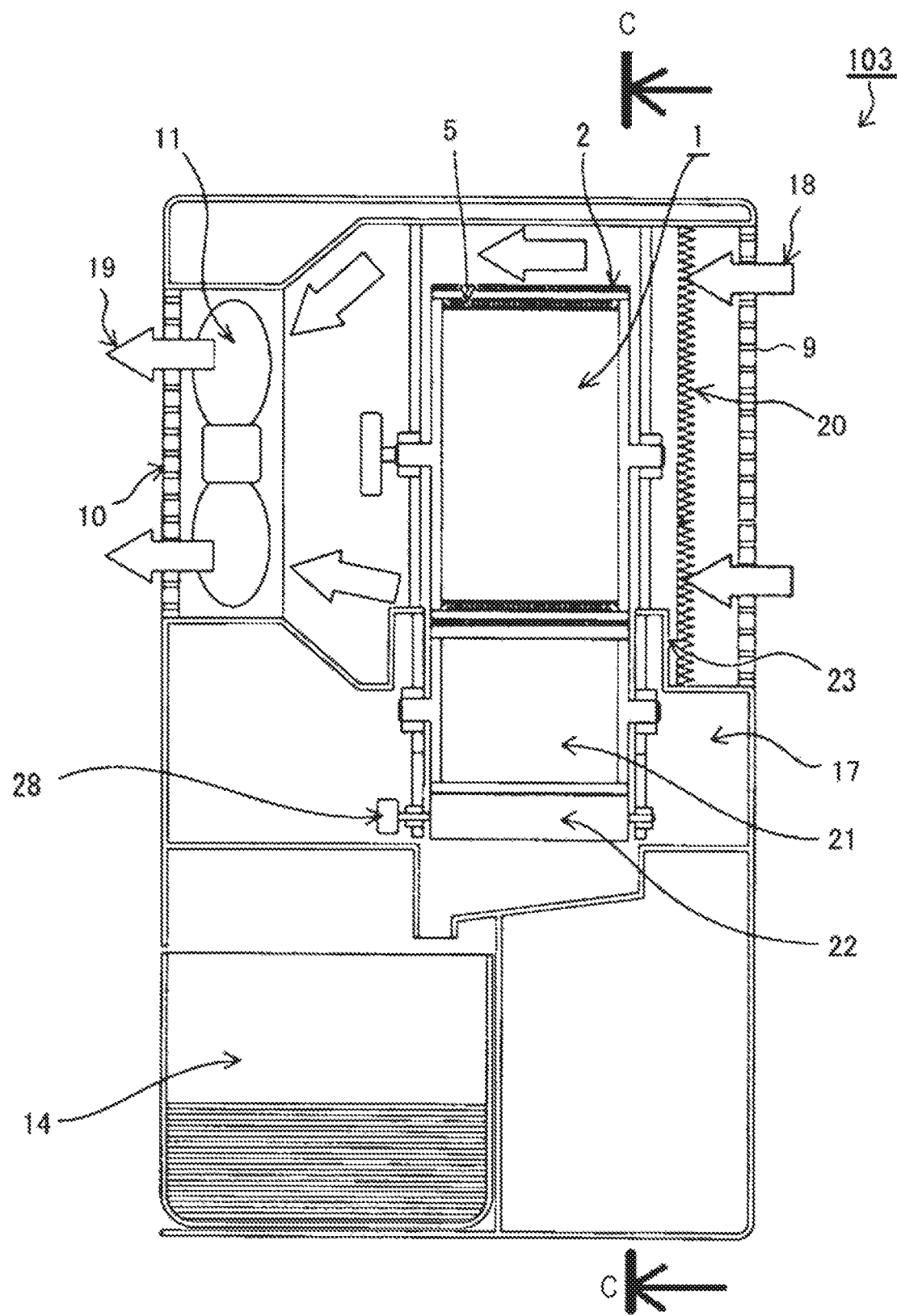
FIG. 9 is a vertical sectional view showing the configuration of a humidity controller of modified example 3.
Figure 10:
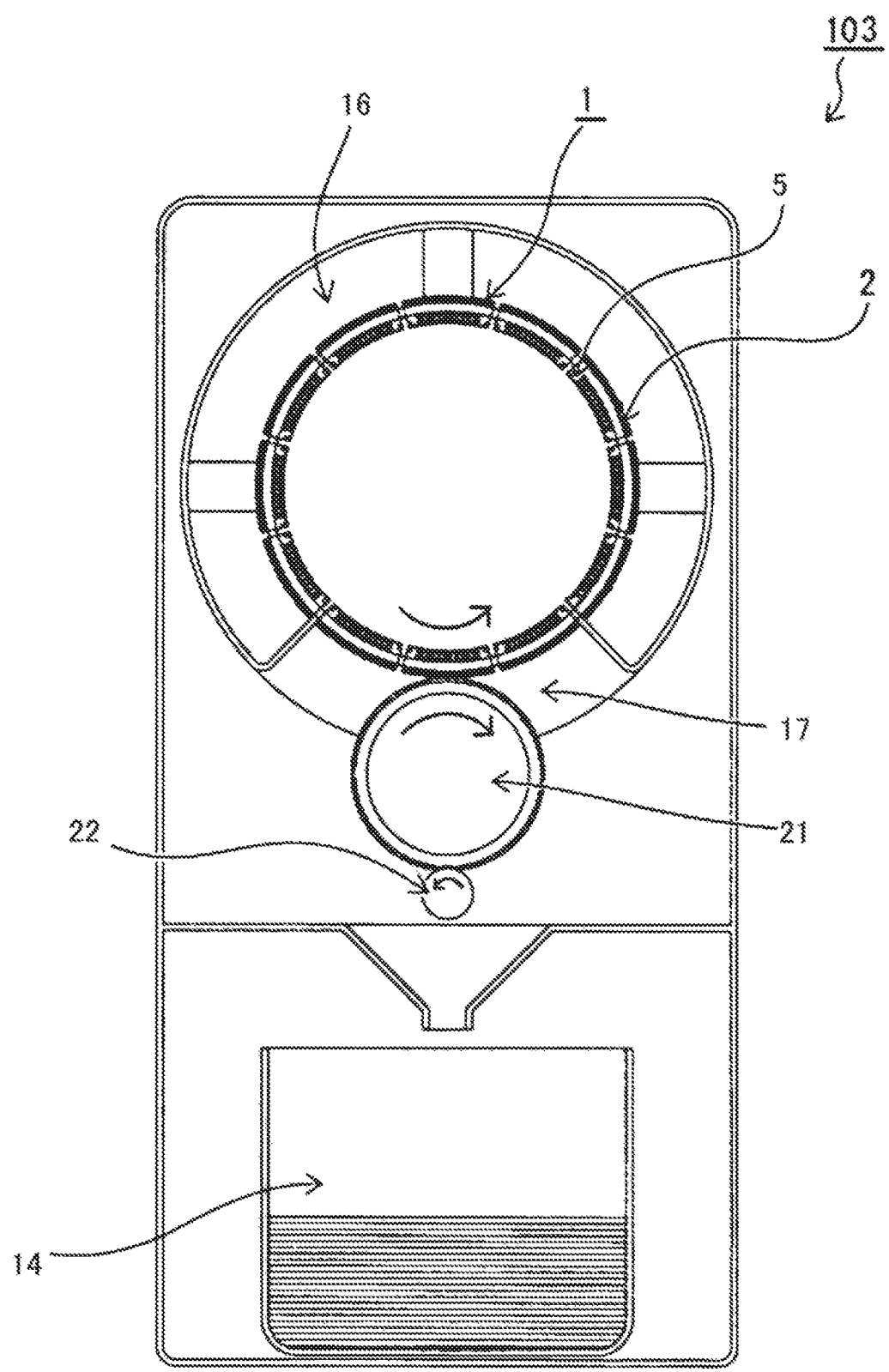
FIG. 10 is a sectional view showing the configuration of the humidity controller cut along line C-C in FIG. 9.

FIG. 9 is a vertical sectional view of a humidity controller 103 of modified example 3. FIG. 10 is a sectional view of the humidity controller 103 cut along line C-C in FIG. 9.

The humidity controller 103 of the modified example is different from modified example 1 in only the configuration of the dehydration area 17. That is, in modified example 3, as shown in FIG. 9 and FIG. 10, a cylindrical transfer portion 21 in contact with the side surface of a circular cylinder to which a plurality of moisture absorbing units 1 are fixed and a cylindrical water-drop-removing portion 22 in contact with the side surface of the circular cylinder of the transfer portion 21 are disposed in the dehydration area 17. The transfer portion 21 is formed by fixing a water absorbent on a cylindrical rotational body and is rotated with rotation of the moisture absorbing unit 1 because of being in contact with each other.

The water absorbent of the transfer portion 21 is composed of a material having a water absorbing property, for example, sponge or a nonwoven fabric. The cylindrical water-drop-removing portion 22 in contact with the cylindrical side surface of the transfer portion 21 is disposed under the transfer portion 21. The water-drop-removing portion 22 is a cylindrical member formed of a material having no water absorbing property. The water-drop-removing portion 22 is driven by a water-drop-removing portion motor 28 and is rotated with rotation of the transfer portion 21.

Figure 11:
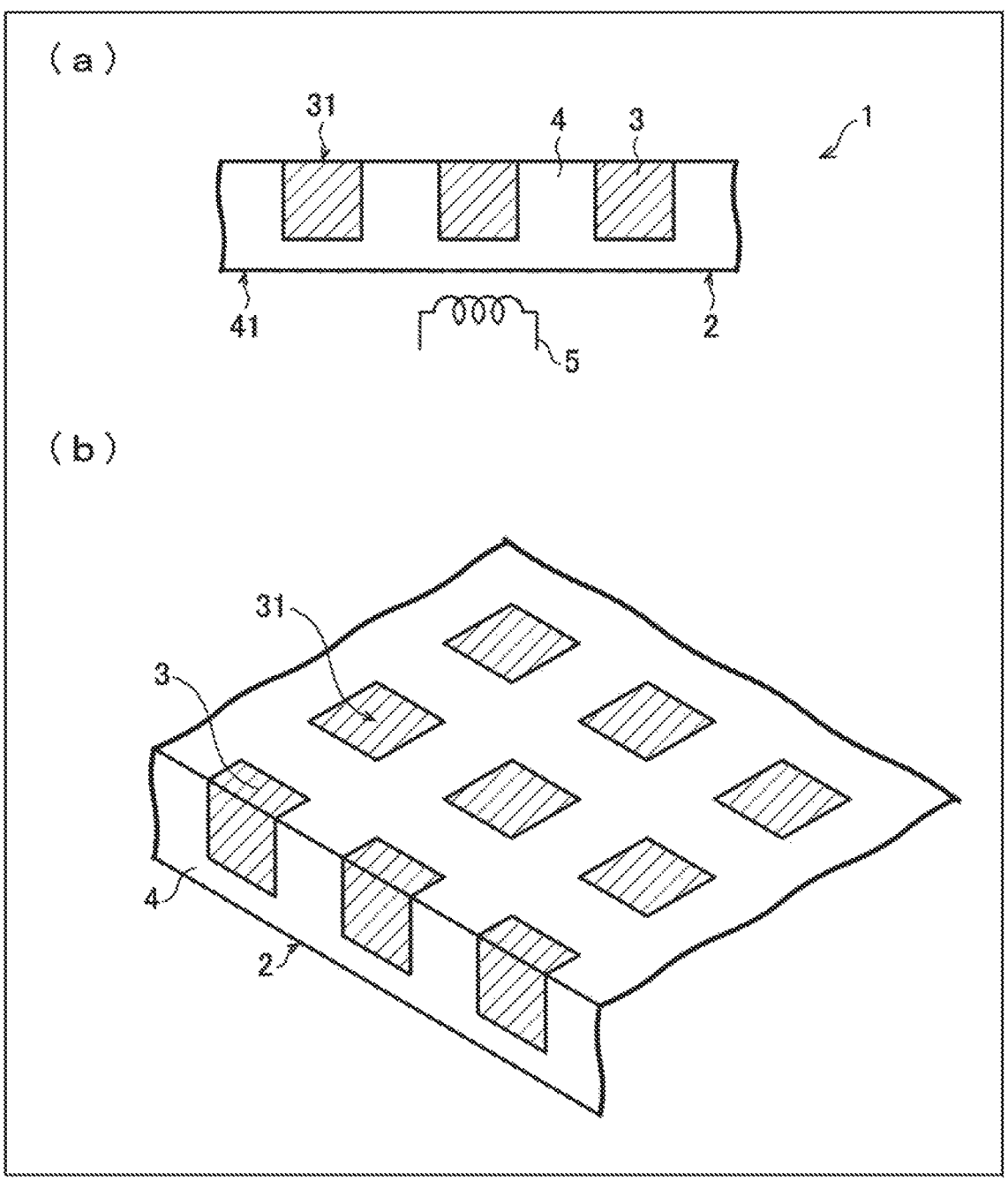
FIG. 11(a) is a schematic side view showing the configuration of a moisture absorbing snit used in the first embodiment according to the present invention.
FIG. 11(b) is a schematic perspective view showing the configuration of a moisture absorbing portion.
Figure 12:
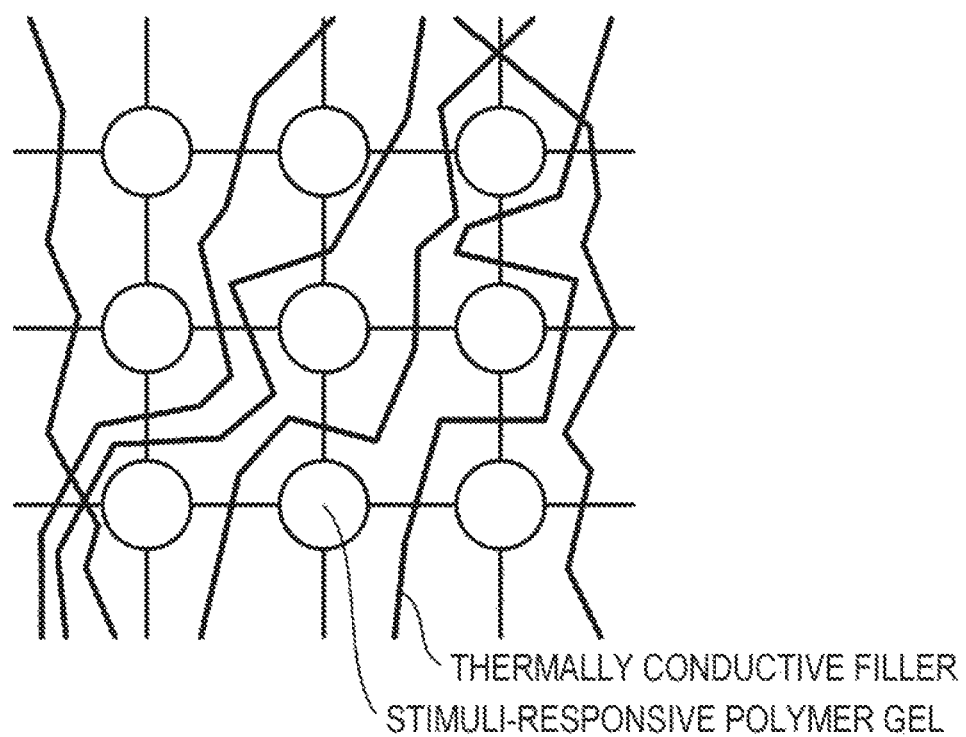
FIG. 12 is an explanatory diagram showing the configuration of a stimuli-responsive polymer gel used as a moisture absorbent, with which a moisture absorbing portion is filled.

The humidity controllers 101 to 103 according to the present embodiment are characterized by the configuration of the moisture absorbing unit 1, in particular, the configuration of the moisture absorbing portion 2. The moisture absorbing portion 2 has a configuration in which absorbed moisture is released from a specific region that is exposed outside and that is disposed on the surface opposite to the heater 5 by using the heat from the heater 5. FIG. 11(a) is a schematic side view showing the configuration of the moisture absorbing unit 1, and FIG. 11(b) is a schematic perspective view showing the configuration of moisture absorbing portion 2. FIG. 12 is an explanatory diagram showing the configuration of a stimuli-responsive polymer gel used as a moisture absorbent, with which the moisture absorbing portion 2 is filled. In this regard, for the sake or facilitating explanation, the heater 5 side of the moisture absorbing portion 2 is assumed to be lower, and the opposite side that opposes to the heater 5 is assumed to be upper.

As shown in FIG. 11(a), the moisture absorbing unit 1 includes the moisture absorbing portion 2 and the heater 5, where the moisture absorbing portion 2 has the moisture absorbent containing a stimuli-responsive polymer with water affinity that changes reversibly in response to external stimuli (temperature stimuli). The heater 5 functions as a stimuli-providing portion that provides external stimuli to degrade water affinity of: the moisture absorbent. The moisture absorbing portion 2 includes at least a dehydrating and moisture absorbing gel section 3 (second gel section) and a high-thermal-conductivity gel section 4 (first gel section). The dehydrating and moisture absorbing gel section 3 and the high-thermal-conductivity gel section 4 are different in the thermal conductivity. Of these gel sections, the high-thermal-conductivity gel section 4 with higher thermal conductivity has an exposed surface 41 (first exposed surface) that is exposed outside on the heater 5 side. The dehydrating and moisture absorbing gel section 3 with lower thermal conductivity has an exposed surface 31 (second exposed surface) that is exposed outside on the opposite side that opposes to the heater 5. In this regard, the dehydrating and moisture absorbing gel section 3 is disposed so as to be partly embedded in the high-thermal-conductivity gel section 4. In the configuration shown in FIGS. 11(a) and 11(b), surfaces other than the exposed surface 31 of the dehydrating and moisture absorbing gel section 3 are in contact with the high-thermal-conductivity gel section 4.

When the moisture absorbing portion 2 is heated to the LCST or higher by the heater 5, the temperature-responsive polymer contained in the moisture absorbing portion 2 is switched from being hydrophilic to hydrophobic. As a result, moisture absorbed into the temperature-responsive polymer is released. Here, the moisture absorbing portion 2 has two gel sections each with a different thermal conductivity, that is, the dehydrating and moisture absorbing gel section 3 and the high-thermal-conductivity gel section 4. Therefore, moisture absorbed into the moisture absorbing portion 2 can be concentrated on one place and be released on the basis of the difference in the rate of heat transfer between the two gels. The moving speed of moisture absorbed into the moisture absorbing portion 2 is less than the rate of heat transfer by the heater 5. Therefore, moisture in the moisture absorbing portion 2 moves in accordance with heat transfer in the moisture absorbing portion 2.

In the moisture absorbing portion 2, the heat of the heater 5 is transferred from the exposed surface 41 of the high-thermal-conductivity gel section 4 and is finally transferred to the dehydrating and moisture absorbing gel section 3 with low thermal conductivity. Accordingly, in the moisture absorbing portion 2, the temperature reaches a temperature higher than or equal to the LCST from the exposed surface 41 of the high-thermal-conductivity gel section 4, and finally, the temperature of the dehydrating and moisture absorbing gel section 3 reaches a temperature higher than or equal to the LCST. In accordance with this, moisture absorbed into the moisture absorbing portion 2 moves from the exposed surface 41 of the high-thermal-conductivity gel section 4 to the dehydrating and moisture absorbing gel section 3.

In this regard, in the moisture absorbing portion 2, the thermal conductivity of the dehydrating and moisture absorbing gel section 3 is lower than the thermal conductivity of the high-thermal-conductivity gel section 4, and the surfaces excluding the exposed surface 31 of the dehydrating and moisture absorbing gel section 3 are in contact with the high-thermal-conductivity gel section 4. Consequently, in the dehydrating and moisture absorbing gel section 3, the heat is transferred from the surrounding surfaces in contact with the high-thermal-conductivity gel section 4, in particular from the lower portion, so as to be transferred to the exposed surface 31. As a result, in the dehydrating and moisture absorbing gel section 3, from the surrounding surfaces in contact with the high-thermal-conductivity gel section 4, in particular the lower portion, the temperature reaches a temperature higher than or equal to the LCST and the water affinity changes from hydrophilic to hydrophobic. Toward the exposed surface 31, successively, the temperature reaches a temperature higher than or equal to the LCST and the water affinity changes from hydrophilic to hydrophobic. In accordance with the change of the hydrophobicity, moisture absorbed by the moisture absorbing portion 2 moves from the surrounding surfaces in contact with the high-thermal-conductivity gel section 4, in particular the lower portion, to a hydrophilic portion in the dehydrating and moisture absorbing gel section 3. Finally, the water is concentrated on the exposed surface 31 of the dehydrating and moisture absorbing gel section 3 and is released as water drops.

In this manner, in the humidity controller 101 according to the present embodiment, the thermal conductivity in the moisture absorbing portion 2 can be controlled by the moisture absorbing portion 2 formed of the dehydrating and moisture absorbing gel section 3 and the high-thermal-conductivity gel section 4 that have different thermal conductivities. Consequently, moisture absorbed by the moisture absorbing portion 2 can be concentrated on the exposed surface 31 of the dehydrating and moisture absorbing gel section 3 and be released due to heating by the heater 5 without forming a skin layer on the exposed surface 31 of the dehydrating and moisture absorbing gel section 3. As a result, in the humidity controller 101 according to the present embodiment, controlling the thermal conductivity in the moisture absorbing portion 2 enables loss due to water evaporation to be reduced and moisture to be efficiently released from the moisture absorbing portion 2.

Meanwhile, the high-thermal-conductivity gel section 4 has the high-thermal-conductivity gel (first gel) containing a thermally conductive filler. As shown in FIG. 12, the high-thermal-conductivity gel has a configuration in which a thermally conductive filer is mixed into a stimuli-responsive polymer gel. The thermal conductivity of the high-thermal-conductivity gel section 4 can be controlled by adjusting the content of the thermally conductive filler. Regarding the dehydrating and moisture absorbing gel section 3, the thermal conductivity can be made lower than the thermal conductivity of the high-thermal-conductivity gel section 4 by reducing the content of the thermally conductive filler to less than that of the high-thermal-conductivity gel section 4 or by containing no thermally conductive filler. That is, the dehydrating and moisture absorbing gel section 3 has a dehydrating and moisture absorbing gel (second gel) containing a smaller amount of thermally conductive filler than the high-thermal-conductivity gel or containing no thermally conductive filler. Consequently, regarding the humidity controller 101 according to the present embodiment, the thermal conductivity of the dehydrating and moisture absorbing gel section 3 and the high-thermal-conductivity gel section 4 can be controlled relative to each other by adjusting the content of the thermally conductive filler of the dehydrating and moisture absorbing gel section 3 and the high-thermal-conductivity gel section 4 relative to each other.

Regarding the thermally conductive filler, for example, at least one thermally conductive filler selected from a group consisting of carbonaceous materials, metal particles, metal oxides, metal hydroxides, nitrogen compounds, carbon compounds, ceramics, and cellulose may be favorably used. More specific examples of the thermally conductive filler include carbonaceous materials, for example, carbon nanotube (CNT), carbon nanofiber (CNF), carbon nanohorn (CNH), carbon fiber, carbon black (CB), fullerene, graphite, and graphene; metal particles of, for example, gold, platinum, silver, copper, palladium, rhodium, iridium, nickel, iron, cobalt, bismuth, aluminum, stainless steel, and titanium; metal oxides, for example, titanium oxide, aluminum oxide, magnesium oxide, zinc oxide, tin oxide, silicon oxide, beryllium oxide, zirconium oxide, copper oxide, and cuprous oxide; metal hydroxides, for example, aluminum hydroxide, magnesium hydroxide, calcium hydroxide, chromium hydroxide, zirconium hydroxide, nickel hydroxide, and boron hydroxide; nitrogen compounds, for example, boron nitride, aluminum nitride, and silicon nitride; carbon compounds, for example, magnesium carbonate, calcium carbonate, barium carbonate, and silicon carbide; ceramics, for example, silica, talc, mica, kaoline, bentonite, and pyrophyllite, titanium boride, and calcium titanate. The metal particles include, for example, metal nanoparticles, metal microparticles, metal nanorods, and metal fibers. One type of the thermally conductive fillers may be used alone, or at least two types may be used in combination. In the case in which carbon nanotubes are used as the thermally conductive filler, it is preferable that metal-type carbon nanotubes be used.

The content of the thermally conductive filler in the moisture absorbent of the dehydrating and moisture absorbing gel section 3 is preferably minimized. Most preferably, the dehydrating and moisture absorbing gel section 3 contains no thermally conductive filler.

There is no particular limitation regarding the ratio of the stimuli-responsive polymer to the thermally conductive filler contained in the moisture absorbent of the high-thermal-conductivity gel section 4. The content of the thermally conductive filler relative to the total amount of the moisture absorbent of the high-thermal-conductivity gel section 4 is 5% by weight or more, preferably 10% by weight or more, and more preferably 20% by weight or more and the content is 30% by weight or less, preferably 25% by weight or less, and more preferably 10% by weight or less.

There is no particular limitation regarding the difference in the content of the thermally conductive filler between the dehydrating and moisture absorbing gel section 3 and the high-thermal-conductivity gel section 4. The difference between the concentration of the thermally conductive filler relative to the total amount of the moisture absorbent of the dehydrating and moisture absorbing gel section 3 and the concentration of the thermally conductive filler relative to the total amount of the moisture absorbent of the high-thermal-conductivity gel section 4 is 5% by weight or more, preferably 10% by weight or more, and more preferably 20% by weight or more and the difference is 30% by weight or less, preferably 25% by weight or less, and more preferably 10% by weight or less.

The volume ratio of the dehydrating and moisture absorbing gel section 3 to the high-thermal-conductivity gel section 4 is 1:99 to 99:1 and is more preferably within the range of 1:9 to 9:1. The volume of the dehydrating and moisture absorbing gel section 3 is preferably larger than the volume of the high-thermal-conductivity gel section 4, preferably 1 time or more the volume of the high-thermal-conductivity gel section 4, more preferably 2 times or more the volume of the high-thermal-conductivity gel section 4, and further preferably 5 times or more the volume of the high-thermal-conductivity gel section 4 and 2 times or less the volume of the high-thermal-conductivity gel section 4, more preferably 5 times or less the volume of the high-thermal-conductivity gel section 4, and further preferably 10 times or less the volume of the high-thermal-conductivity gel section 4.

Further, it is desirable that the thermally conductive filler in the high-thermal-conductivity gel section 4 be oriented from the lower side (heater 5 side) toward the upper side (opposite to heater 5) of the moisture absorbing portion 2. In addition, in consideration of the water transfer efficiency during dehydration, it is desirable that the dehydrating and moisture absorbing gel section 3 be further subdivided, and the high-thermal-conductivity gel section 4 be also subdivided likewise. That is, it is desirable that the dehydrating and moisture absorbing gel section 3 and the high-thermal-conductivity gel section 4 be formed thin in the lateral direction.

Second Embodiment

Another embodiment according to the present invention will be described below. In this regard, for the sake of facilitating explanation, a member having the same function as the member in the above-described embodiment is indicated by the same references, and explanations thereof may be omitted.

Figure 13:
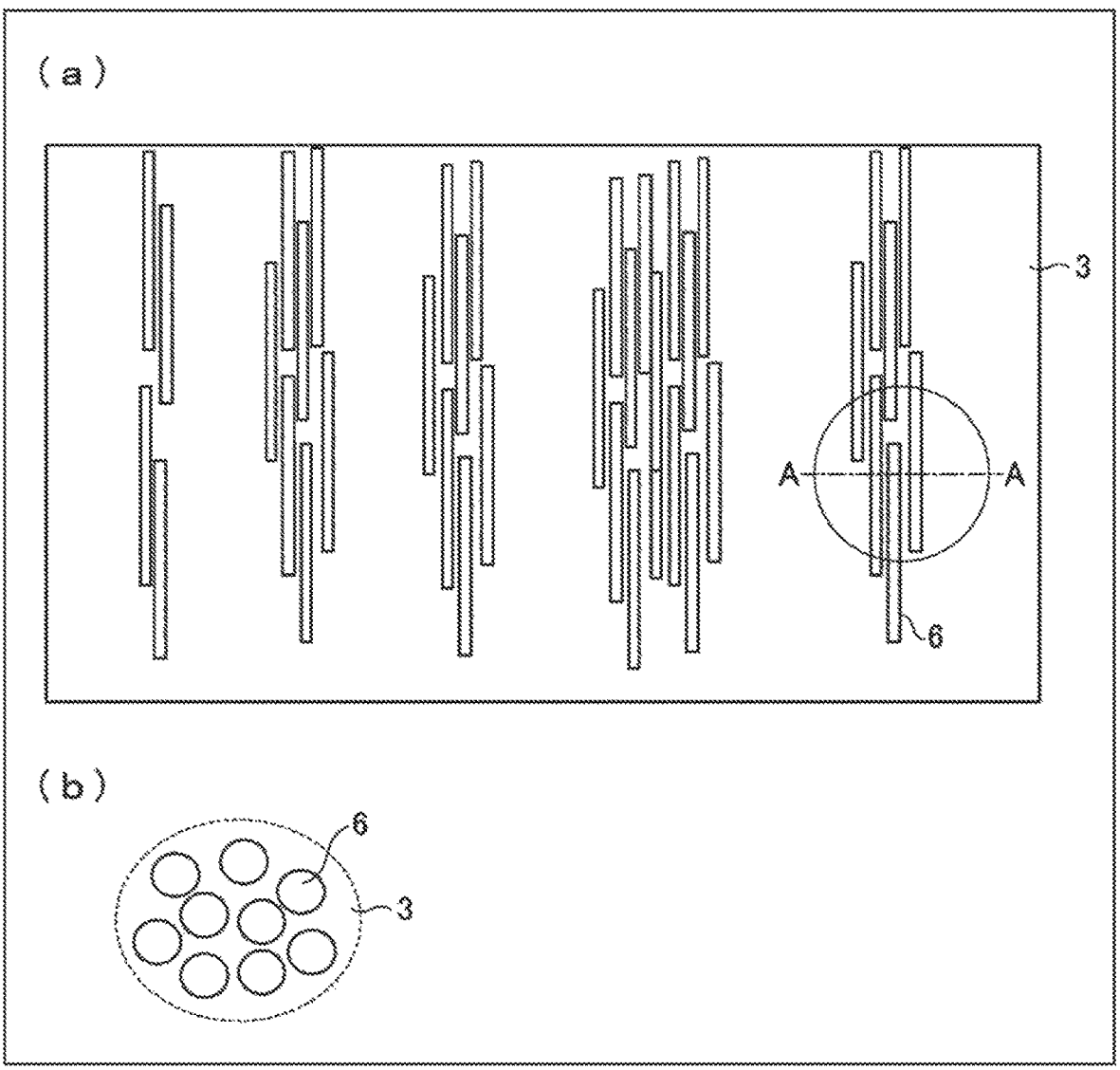
FIG. 13 schematically shows the configuration of a dehydrating and moisture absorbing gel section included in a moisture absorbing portion of a moisture absorbing unit in the humidity controller according to the second embodiment of the present invention.

FIG. 13 schematically shows the configuration of a dehydrating and moisture absorbing gel section 3 included in a moisture absorbing portion of a moisture absorbing unit in the humidity controller according to the present embodiment, FIG. 13(a) is a sectional view, and FIG. 13(b) is a sectional view cut along line A-A in FIG. 13(a). As shown in FIG. 13(a) and FIG. 13(b), the humidity controller according to the present embodiment is different from the humidity controller in the first embodiment in that water conduit holes 6 are formed in the dehydrating and moisture absorbing gel section 3 of the moisture absorbing portion.

The water conduit holes 6 may be formed by, for example, inserting capillary members with a high aspect ratio such as fine pipes into the dehydrating and moisture absorbing gel of the dehydrating and moisture absorbing gel section 3. The water conduit holes 6 are formed so as to be oriented from the lower side (heater side) toward the upper side (opposite to heater). Consequently, moisture that moves into the dehydrating and moisture absorbing gel section 3 remains in the water conduit holes 6. As a result, water evaporation in the dehydrating and moisture absorbing gel section 3 during heating by the heater can be suppressed from occurring.

In the humidity controller according to the present embodiment, water evaporation in the dehydrating and moisture absorbing gel section 3 can also be suppressed by inserting a hydrophilic clay mineral material instead of the water conduit holes 6 into the dehydrating and moisture absorbing gel section 3. There is no particular limitation regarding the hydrophilic clay mineral material, and examples include imogolite.

Examples of the method for forming the water conduit holes 6 in the dehydrating and moisture absorbing gel section 3 include a method in which the capillary members inserted into the dehydrating and moisture absorbing gel are pulled out, and, thereafter, the resulting holes are used as the water conduit holes 6. Alternatively, the water conduit holes 6 may be formed by forming a porous or monolithic dehydrating and moisture absorbing gel.

Third Embodiment

Another embodiment according to the present invention will be described below. In this regard, for the sake of facilitating explanation, a member having the same function as the member in the above-described embodiment is indicated by the same references, and explanations thereof may be omitted.

Figure 14:
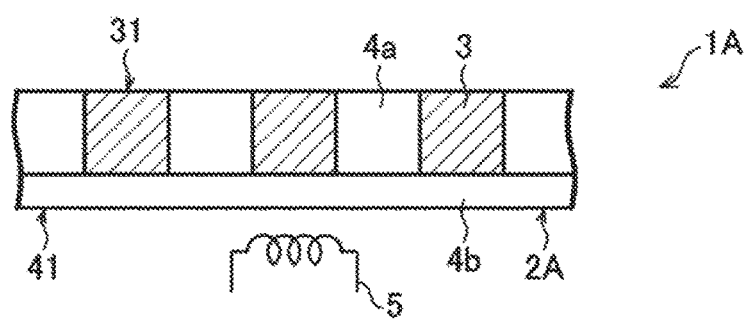
FIG. 14 is a schematic side view showing the configuration of a moisture absorbing unit in the humidity controller according to the third embodiment of the present invention.

FIG. 14 is a schematic side view showing the configuration of a moisture absorbing unit 1A in the humidity controller according to the present embodiment. The humidity controller according to the present embodiment is different from the humidity controller in the first embodiment in that the concentration of the thermally conductive filler in a high-thermal-conductivity gel in the moisture absorbing portion 2A is increased stepwise with increasing proximity to the heater 5.

As shown in FIG. 14, in the moisture absorbing portion 2A, a second high-thermal-conductivity gel section 4b is disposed nearer than a first high-thermal-conductivity gel section 4a to the heater 5.

The concentration of the thermally conductive filler in the second high-thermal-conductivity gel section 4b is higher than the concentration of the thermally conductive filler in the first high-thermal-conductivity gel section 4a. Consequently, the second high-thermal-conductivity gel section 4b has higher thermal conductivity than the first high-thermal-conductivity gel section 4a.

The second high-thermal-conductivity gel section 4b having relatively high thermal conductivity is in contact with the lower surface of the dehydrating and moisture absorbing gel section 3, whereas the first high-thermal-conductivity gel section 4a having relatively low thermal conductivity is in contact with the side surface of the dehydrating and moisture absorbing gel section 3. Therefore, in the moisture absorbing portion 2A, the heat is transferred to the side surface of the dehydrating and moisture absorbing gel section 3 after the lower surface of the dehydrating and moisture absorbing gel section 3 due to the first high-thermal-conductivity gel section 4a and the second high-thermal-conductivity gel section 4b. As described above, in the humidity controller according to the present embodiment, increasing the concentration of the thermally conductive filler stepwise with increasing proximity to the heater 5 enables the thermal conductivity to the dehydrating and moisture absorbing gel section 3 to be minutely controlled. As a result, heat transfer in the moisture absorbing portion 2 can be more strictly controlled, and formation of a skin layer on the exposed surface 31 of the dehydrating and moisture absorbing gel section 3 can be suppressed.

In the configuration shown in FIG. 14, the concentration of the thermally conductive filler in the high-thermal-conductivity gel section is changed in two steps due to the first high-thermal-conductivity gel section 4a and the second high-thermal-conductivity gel section 4b. However, the high-thermal-conductivity gel section is not limited to have this configuration and may have a configuration in which the concentration of the thermally conductive filler changes in more than two steps.

Fourth Embodiment

Another embodiment according to the present invention will be described below. In this regard, for the sake of facilitating explanation, a member having the same function as the member in the above-described embodiment is indicated by the same references, and explanations thereof may be omitted.

Figure 15:
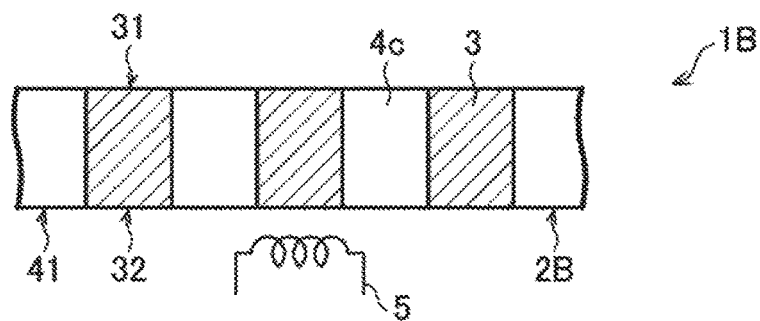
FIG. 15 is a schematic side view showing the configuration of a moisture absorbing unit in a humidity controller according to a fourth embodiment of the present invention.

FIG. 15 is a schematic side view showing the configuration of a moisture absorbing unit 1B in the humidity controller according to the present embodiment. The humidity controller according to the present embodiment is different from the humidity controller in the first embodiment in that the dehydrating and moisture absorbing gel section 3 in the moisture absorbing portion 2B has an exposed surface 32 exposed outside on the heater 5 side.

As shown in FIG. 15, the dehydrating and moisture absorbing gel section 3 and the high-thermal-conductivity gel section 4c are disposed alternately in the direction perpendicular to the vertical direction. When heating is performed by the heater 5, the heat is directly transferred to the dehydrating and moisture absorbing gel section. 3 through the exposed surface 32 on the heater 5 side. In addition, the heat is transferred from the high-thermal-conductivity gel section 4c to the dehydrating and moisture absorbing gel section 3 from the surrounding surfaces in contact with the high-thermal-conductivity gel section 4c.

Consequently, regarding the dehydrating and moisture absorbing gel section 3, the heat is directly transferred through the exposed surface 32 and, in addition, transferred from the surrounding surfaces due to the high-thermal-conductivity gel section 4, while the heat is transferred from the exposed surface 32 on the heater 5 side toward the exposed surface 31. Therefore, in the dehydrating and moisture absorbing gel section 3, the temperature of the exposed surface 32 reaches a temperature higher than or equal to the LCST and the water affinity changes from hydrophilic to hydrophobic. Subsequently, from the surrounding surfaces, the temperature reaches a temperature higher than or equal to the LCST and the water affinity changes from hydrophilic to hydrophobic, while the temperature reaches a temperature higher than or equal to the LCST and the water affinity changes from hydrophilic to hydrophobic successively from the hydrophobic exposed surface 32 toward the exposed surface 31. In accordance with the change of the hydrophobicity, moisture absorbed by the moisture absorbing portion 2 moves from the hydrophobic exposed surface 32 to a hydrophilic portion in the dehydrating and moisture absorbing gel section 3. Finally, the water is concentrated on the exposed surface 31 of the dehydrating and moisture absorbing gel section 3 and is released as water drops.

In this manner, in the humidity controller according to the present embodiment, heating by the heater 5 enables the moisture absorbed by the moisture absorbing portion 2 to be concentrated on the exposed surface 31 of the dehydrating and moisture absorbing gel section 3 and to be released without forming a skin layer on the exposed surface 31 of the dehydrating and moisture absorbing gel section 3.

Fifth Embodiment

Another embodiment according to the present invention will be described below. In this regard, for the sake of facilitating explanation, a member having the same function as the member in the above-described embodiment is indicated by the same references, and explanations thereof may be omitted.

Figure 16:
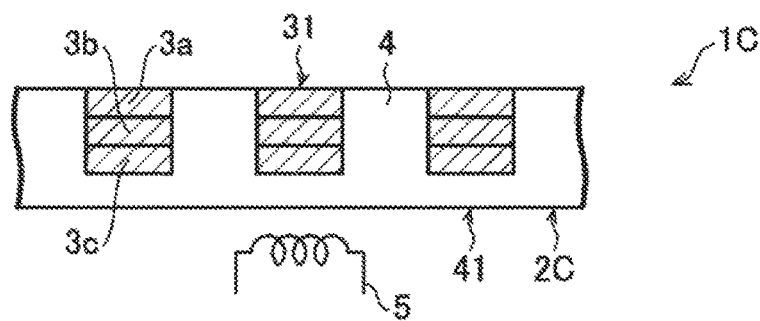
FIG. 16 is a schematic side view showing the configuration of a moisture absorbing unit in a humidity controller according to a fifth embodiment of the present invention.

FIG. 16 is a schematic side view showing the configuration of a moisture absorbing unit 1C in the humidity controller according to the present embodiment. The humidity controller according to the present embodiment is different from the humidity controller in the first embodiment in the configuration of the dehydrating and moisture absorbing gel section in the moisture absorbing portion 2C. The moisture absorbent of the dehydrating and moisture absorbing gel section in the moisture absorbing portion 2C contains a stimuli-responsive polymer and a hydrophilic polymer, and the concentration of the hydrophilic polymer is decreased with increasing proximity to the heater 5.

As shown in FIG. 16, the dehydrating and moisture absorbing gel section has a configuration in which a first dehydrating and moisture absorbing gel section 3a, a second dehydrating and moisture absorbing gel section 3b, and a third dehydrating and moisture absorbing gel section 3c are arranged in this order from the upper side toward the lower side. Regarding the concentration of the hydrophilic polymer relative to a temperature-responsive polymer in the moisture absorbent, the third dehydrating and moisture absorbing gel section 3c near the heater 5 is the lowest, and the first dehydrating and moisture absorbing gel section 3a is the highest. The concentration of the hydrophilic polymer in the moisture absorbent in the second dehydrating and moisture absorbing gel section 3b is in between the concentration in the first dehydrating and moisture absorbing gel section 3a and the concentration in the third dehydrating and moisture absorbing gel section 3c. That is, in the humidity controller according to the present embodiment, the concentration of the hydrophilic polymer relative to the temperature-responsive polymer in the dehydrating and moisture absorbing gel section is decreased with increasing proximity to the heater 5.

Therefore, in the dehydrating and moisture absorbing gel section in the moisture absorbing portion 2C, the hydrophilicity of the moisture absorbent is increased in the order of the third dehydrating and moisture absorbing gel section 3c, the second dehydrating and moisture absorbing section 3b, and the first dehydrating and moisture absorbing gel section 3a. That is, the hydrophilicity of the moisture absorbent is increased from the lower portion to which the heat is transferred toward the exposed surface 31. Consequently, when heating is performed by the heater 5, the heat is transferred in the order of the third dehydrating and moisture absorbing gel section 3c, the second dehydrating and moisture absorbing gel section 3b, and the first dehydrating and moisture absorbing gel section 3a. Accordingly, the change from hydrophilicity to hydrophobicity is reduced in the order of the third dehydrating and moisture absorbing gel section 3c, the second dehydrating and moisture absorbing gel section 3b, and the first dehydrating and moisture absorbing gel section 3a. As a result, in the dehydrating and moisture absorbing gel section 3, the amount of the hydrophilic portion in which moisture moves is increased toward the upper side, and concentration of water on the exposed surface 31 is facilitated.

Sixth Embodiment

Another embodiment according to the present invention will be described below. In this regard, for the sake of facilitating explanation, a member having the same function as the member in the above-described embodiment is indicated by the same references, and explanations thereof may be omitted.

Figure 17:
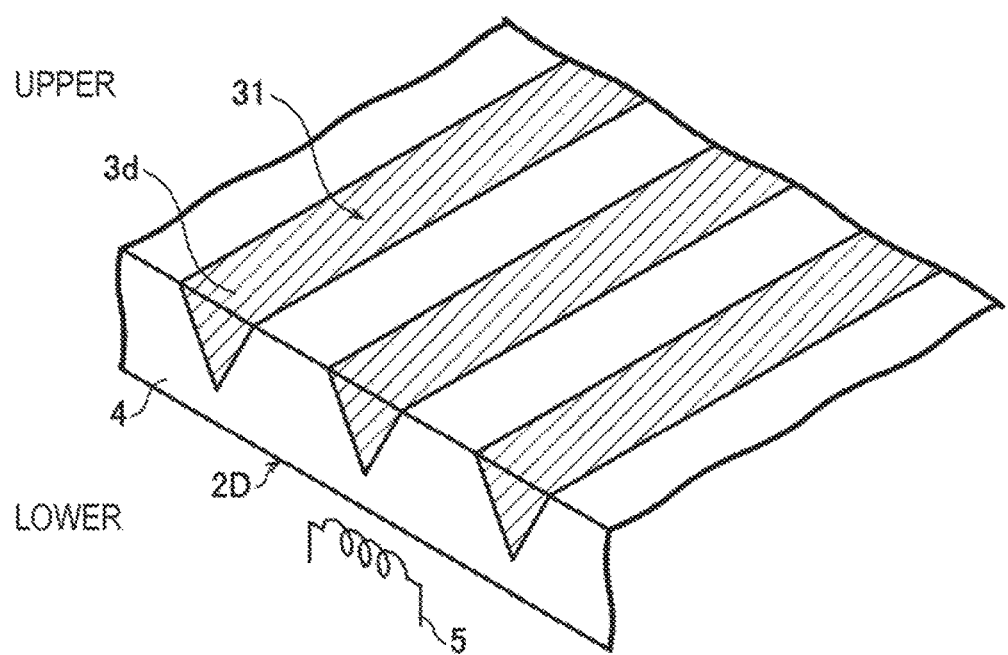
FIG. 17 is a schematic perspective view showing the configuration of a moisture absorbing portion in a humidity controller according to a sixth embodiment of the present invention.

FIG. 17 is a schematic perspective view showing the configuration of a moisture absorbing portion 2D in a humidity controller according to the present embodiment. The humidity controller according to the present embodiment is different from the humidity controller in the first embodiment in the shape of the dehydrating and moisture absorbing gel section 3d in the moisture absorbing portion 2D.

As shown in FIG. 17, the dehydrating and moisture absorbing gel section 3d is disposed such that the width is decreased with increasing proximity to the heater 5. In other words, the dehydrating and moisture absorbing gel section 3d is disposed such that the size in the direction perpendicular to the vertical direction is decreased with increasing proximity to the heater 5.

More specifically, the dehydrating and moisture absorbing gel section 3d has the shape of a triangular prism with a corner portion on the heater 5 side. A plurality of dehydrating and moisture absorbing gel sections 3d are disposed parallel to each other. A moisture absorbing portion 2D having such a configuration is produced by forming V-shaped grooves in the high-thermal-conductivity gel section 4 and by filling the resulting grooves with the dehydrating and moisture absorbing gel that is a material for forming the dehydrating and moisture absorbing gel section 3d.

Consequently, the moisture absorbed by the moisture absorbing portion 2D can be concentrated on the exposed surface 31 of the dehydrating and moisture absorbing gel section 3d and be released without forming a skin layer on the exposed surface 31 of the dehydrating and moisture absorbing gel section 3d.

In the present embodiment, the dehydrating and moisture absorbing gel section is not limited to have the shape shown in FIG. 17 provided that the dehydrating and moisture absorbing gel section is disposed such that the width is decreased with increasing proximity to the heater 5. For example, a configuration shown in FIG. 18 may be adopted.

Figure 18:
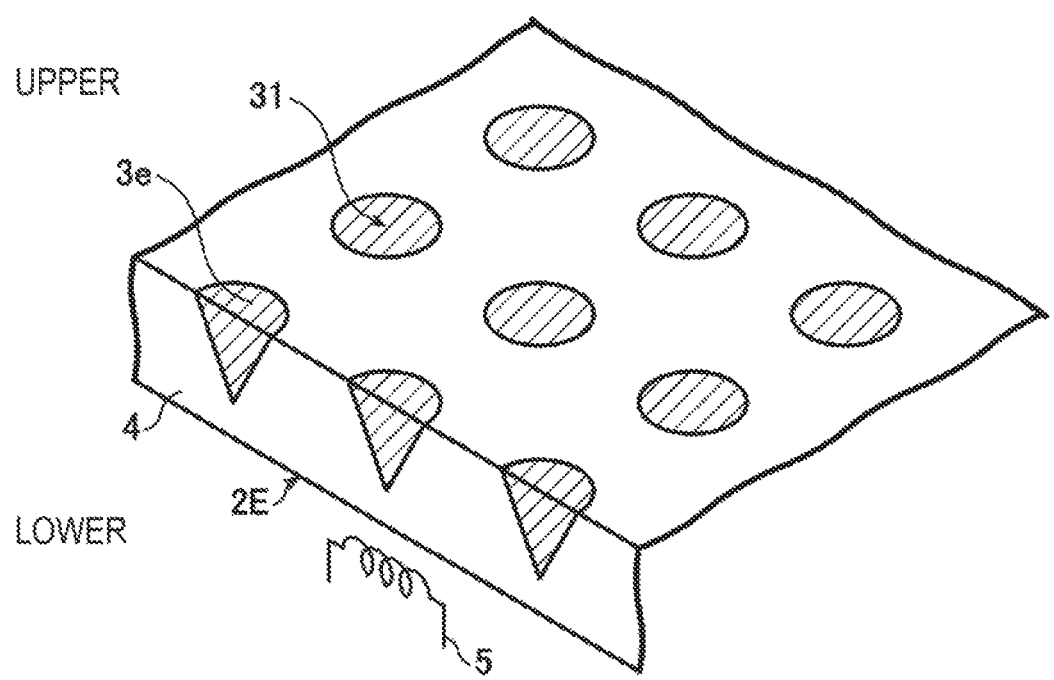
FIG. 18 is a schematic perspective view showing the configuration of a modified example of a moisture absorbing portion in the humidity controller according to the sixth embodiment of the present invention.

As shown in FIG. 18, a dehydrating and moisture absorbing gel section 3e in a moisture absorbing portion 2E has a conical (mortar-like) shape with a vertex on the heater 5 side. Even such a configuration is adopted, the moisture absorbed by the moisture absorbing portion 2E can be concentrated on the exposed surface 31 of the dehydrating and moisture absorbing gel section 3e and be released.

[Detail of Moisture Absorbent Containing Stimuli-Responsive Polymer]

Next, the moisture absorbent containing a stimuli responsive polymer that is used in each of the above-described embodiments will be described in detail. It is preferable that this moisture absorbent contain a stimuli-responsive polymer and a hydrophilic polymer. For example, the moisture absorbent is an interpenetrating polymer network structure or a semi-interpenetrating polymer network structure of the stimuli-responsive polymer and the hydrophilic polymer. In the present specification, "A to B" expressing a numerical range refers to "A or more and B or less", unless otherwise specified. In addition, either "acryl" or "methacryl" is expressed as "(meth)acryl".

(I) Moisture Absorbent

Regarding the moisture absorbent used in each of the above-described embodiments, a moisture absorbent containing a dry body of stimuli-responsive polymer with water affinity that switches reversibly between hydrophilicity and hydrophobicity in response to external stimuli may be used. In this regard, there is no particular limitation regarding the shape of the moisture absorbent. For example, the shape of a plate, a sheet, a film, or a block may be adopted, or the shape of a particle may be adopted. There is no particular limitation regarding the shape of the particulate moisture absorbent. For example, a substantially spherical shape or a rod-like shape may be adopted. Meanwhile, there is no particular limitation regarding the size of the moisture absorbent according to the present invention, and the size may be appropriately selected in accordance with the configuration of the humidity controller.

(Dry Body of Moisture Absorbent Containing Stimuli-Responsive Polymer)

In the present invention, a dry body of moisture absorbent containing stimuli-responsive polymer is used.

In particular, when the stimuli-responsive polymer is a cross-linked body, in many cases, the three-dimensional network structure formed by cross-linking the polymer produces a polymer gel that has swelled by absorbing a solvent, for example, water or an organic solvent. In such a case, in the present invention, a dry body of the polymer gel is used as the moisture absorbent. Here, the dry body of the polymer gel is produced by drying a polymer gel so as to remove a solvent. In this regard, in the present invention, the solvent is not limited to be completely removed from the polymer gel, and the dry body of the polymer gel may contain the solvent or water provided that moisture from the air can be absorbed. Therefore, there is no particular limitation regarding the water content of the dry body of the polymer gel provided that the dry body can absorb moisture from the air. For example, the water content is more preferably 40% by weight or less. Here, a water content refers co the proportion of moisture relative to the dry weight of the polymer gel.

(Stimuli-Responsive Polymer)

A stimuli-responsive polymer is a polymer with properties that changes reversibly in accordance with external stimuli. In the present invention, a stimuli-responsive polymer with water affinity that switches reversibly between hydrophilicity and hydrophobicity in response to external stimuli is used.

There is no particular limitation regarding the external stimuli, and examples include heat, light, electric field, and pH (hydrogen ion exponent).

In this regard, "water affinity switches reversibly between hydrophilicity and hydrophobicity in response to external stimuli" denotes that a polymer exposed to external stimuli switches reversibly between being hydrophilic and being hydrophobic in response to the external stimuli.

In particular, a stimuli-responsive polymer with water affinity that changes reversibly in response to heat, that is, a temperature-responsive polymer (heat-responsive polymer), can reversibly perform absorption of moisture from the air and release of the absorbed moisture by changing the temperature by using a simple heating device. Consequently, the temperature-responsive polymer can be particularly favorably used for a humidity controller.

There is no particular limitation regarding such a temperature-responsive polymer provided that the polymer has a lower critical solution temperature (LCST). The polymer having a LCST is hydrophilic at low temperature but becomes hydrophobic at a temperature higher than or equal to the LCST. In this regard, LCST denotes the boundary temperature in the case in which, when a polymer is dissolved in water, the polymer is hydrophilic and is dissolved in water at low temperature, but the polymer becomes hydrophobic and insoluble at a certain temperature or higher.

More specific examples of the temperature-responsive polymer include poly(N-alkyl(meth)acrylamide), for example, poly(N-isopropyl(meth)acrylamide), poly(N-normal-propyl(meth)acrylamide), poly(N-methyl(meth)acrylamide), poly(N-ethyl(meth)acrylamide), poly(N-normal-butyl(meth)acrylamide), poly(N-isobutyl(meth)acrylamide), and poly(N-t-butyl(meth)acrylamide); poly(N-vinyl alkylamide), for example, poly(N-vinyl isopropylamide), poly(N-vinyl normal-propylamide), poly(N-vinyl normal-butylamide), poly(N-vinyl isobutylamide), and poly(N-vinyl-t-butylamide); poly(N-vinyl pyrrolidone); poly(2-alkyl-2-oxazoline), for example, poly(2-ethyl-2-oxazoline), poly(2-isopropyl-2-oxazoline), and poly(2-normal-propyl-2-oxazoline); polyvinyl alkyl ethers, for example, polyvinyl methyl ether and polyvinyl ethyl ether; copolymers of polyethylene oxide and polypropylene oxide; poly(oxyethylene vinyl ether); and cellulose derivatives, for example, methyl cellulose, ethyl cellulose, hydroxypropyl cellulose, and hydroxypropylmethyl cellulose, and copolymers of these polymer compounds.

In addition, the temperature responsive polymers may be cross-linked bodies of these polymer compounds. In the case in which the temperature-responsive polymer is a cross-linked body, examples of the cross-linked body include polymer compounds obtained by polymerizing a monomer such as N-alkyl(meth)acrylamide, for example, N-isopropyl(meth)acrylamide, N-normal-propyl(meth)acrylamide, N-methyl(meth)acrylamide, N-ethyl(meth)acrylamide, N-normal-butyl(meth)acrylamide, N-isobutyl(meth)acrylamide, or N-t-butyl(meth)acrylamide); N-vinyl alkylamide, for example, N-vinyl isopropylamide, N-vinyl normal-propylamide, N-vinyl normal-butylamide, N-vinyl isobutylamide, or N-vinyl-t-butylamide; vinyl alkyl ether, for example, vinyl methyl ether or vinyl ethyl ether; ethylene oxide or propylene oxide; or 2-alkyl-2-oxazoline, for example, 2-ethyl-2-oxazoline, 2-isopropyl-2-oxazoline, or 2-normal-propyl-2-oxazoline, or polymerizing at least two of these monomers in the presence of a cross-linking agent.

Regarding the cross-linking agent, a known cross-linking agent in the related art may be appropriately selected and used. For example, cross-linkable monomers having a polymerizable functional group such as ethylene glycol di(meth)acrylate, propylene glycol di(meth)acrylate, N,N'-methylenebis(meth)acrylamide, tolylene diisocyanate, divinylbenzene, and polyethylene glycol di(meth)acrylate; glutaraldehyde; polyhydric alcohols; polyvalent amines; polyvalent carboxylic acids, and metal ions such as calcium Ions and zinc ions can be favorably used. These cross-linking agents may be used alone, or at least two types may be used in combination.

Alternatively, in the case in which the temperature-responsive polymer is a cross-linked body, such a cross-linked body may be a cross-linked body obtained by reacting a temperature-responsive polymer that is not cross-linked, for example, the temperature-responsive polymer described above as an example, with the above-described cross-linking agent so as to form a network structure.

Examples of the stimuli-responsive polymer with water affinity that changes reversibly in response to light include polymer compounds with hydrophilicity or polarity that changes due to light, for example, azobenzene derivatives and spiropyran derivatives, copolymers of these and at least any one of temperature-responsive polymers and pH-responsive polymer compounds, cross-linked bodies of the above-described light-responsive polymers, and cross-linked bodies of the above-described copolymers.

Examples of the stimuli-responsive polymer with water affinity that changes reversibly in response to an electric field include polymer compounds having a dissociated group, for example, a carboxy group, a sulfonic acid group, a phosphoric acid group, or an amino group, and polymer compounds in which a complex is formed by an electrostatic interaction or a hydrogen bond, for example, a complex of a carboxy-group-containing polymer compound and an amino-group-containing polymer compound, and cross-linked bodies of these.

Examples of the stimuli-responsive polymer with water affinity that changes reversibly in response to pH include polymer compounds having a dissociated group, for example, a carboxy group, sulfonic acid group, a phosphoric acid group, or an amino group, and polymer compounds in which a complex is formed by an electrostatic interaction or a hydrogen bond, for example, a complex of a carboxy-group-containing polymer compound and an amino-group-containing polymer compound, and cross-linked bodies of these.

The stimuli-responsive polymer may be derivatives of the above-described stimuli-responsive polymers or copolymers with other monomers. There is no particular limitation regarding the above-described other monomers and any monomers may be adopted. For example, a monomer such as (meth)acrylic acid, allylamine, vinyl acetate, (meth)acrylamide, N,N'-dimethyl(meth)acrylamide, 2-hydroxyethyl methacrylate, alkyl(meth)acrylate, maleic acid, vinylsulfonic acid, vinylbenzenesulfonic acid, acrylamide alkylsulfonic acid, dimethylaminopropyl(meth)acrylamide, or (meth)acrylonitrile can be favorably used.

Alternatively, the stimuli-responsive polymer may be a polymer that has an interpenetrating polymer network structure or a semi-interpenetrating polymer network structure formed with another polymer which is cross-linked or not cross-linked.

There is no particular limitation regarding the molecular weight of the above-described stimuli-responsive polymer, and the number average molecular weight determined by gel permeation chromatography (GPC) is preferably 3,000 or more.

((Semi)Interpenetrating Polymer)

It is more preferable that the moisture absorbent containing a stimuli-responsive polymer be a (semi) interpenetrating polymer produced by the stimuli-responsive polymer and the hydrophilic polymer forming an interpenetrating polymer network structure or a semi-interpenetrating polymer network structure. Such a (semi)interpenetrating polymer has a stimuli-responsive polymer function to change between the state that absorbs moisture and the state that release the absorbed moisture in response to external stimuli and high moisture absorbing power in combination and, therefore, is very suitable for a moisture absorbent. In this regard, in the present specification, a (semi)interpenetrating polymer denotes an interpenetrating polymer and/or a semi-interpenetrating polymer.

Here, an interpenetrating polymer network structure denotes a structure in which different types of polymers, each being a cross-linked polymer, are entangled with each other while cross-linked network structures of the respective polymers are independently present without being chemically bonded to each other. Meanwhile, a semi-interpenetrating polymer network structure denotes a structure in which one of different types of polymers is a cross-linked polymer, the other is a straight-chain polymer, and the polymers are entangled with each other while the respective polymers are independently present without being chemically bonded to each other.

In the former case, each of the stimuli-responsive polymer and the hydrophilic polymer is a cross-linked polymer having a cross-linked network, and the cross-linked network of the stimuli-responsive polymer and the cross-linked network of the hydrophilic polymer form a structure in which these networks are entangled with each other without being chemically bonded to each other, that is, an interpenetrating polymer network structure.

In the latter case, any one of the stimuli-responsive polymer and the hydrophilic polymer is a cross-linked polymer having a cross-linked network and the other is a straight-chain polymer, and the stimuli-responsive polymer and the hydrophilic polymer form a structure in which these polymers are entangled with each other without being chemically bonded to each other, that is, a semi-interpenetrating polymer network structure.

Examples of the hydrophilic polymer include polymers having a hydrophilic group, for example, a hydroxy group, carboxy group, a sulfonic acid group, a phosphoric aid group, and an amino group, in the side chain or the main chain. More specific examples of the hydrophilic polymer include polysaccharide, for example, alginic acid and hyaluronic acid; chitosan; cellulose derivatives, for example, carboxymethyl cellulose, methyl cellulose, ethyl cellulose, and hydroxyethyl cellulose; poly(meth)acrylic acids, polymaleic acids, polyvinylsulfonic acids, polyvinylbenzenesulfonic acids, polyacrylamide alkylsulfonic acids, and polydimethylaminopropyl(meth)acrylamides and copolymers of these and (meth)acrylamide, hydroxyethyl (meth) acrylate, (meth)acrylic acid alkyl ester, or the like, complexes of polydimethylaminopropyl(meth)acrylamide and polyvinyl alcohol, complexes of polyvinyl alcohol and poly (meth)acrylic acid, poly(meth)acrylonitriles, polyallylamines, polyvinyl alcohols, polyethylene glycols, polypropylene glycols, poly(meth)acrylamides, poly-N,N'-dimethyl (meth)acrylamides, poly-2-hydroxyethyl methacrylates, poly-alkyl(meth)acrylates, polydimethylaminopropyl(meth) acrylamides, and poly(meth)acrylonitriles and copolymers of the above-described polymers. Of these, it is preferable that the hydrophilic polymer be alginic acid.

The hydrophilic polymer may be a cross-linked body. In the case in which the hydrophilic polymer is a cross-linked body, examples of the cross-linked body include polymers obtained by polymerizing a monomer such as (meth)acrylic acid, allylamine, vinyl acetate, (meth)acrylamide, N,N'-dimethyl(meth)acrylamide, 2-hydroxyethyl methacrylate, alkyl (meth)acrylate, maleic acid, vinylsulfonic acid, vinylbenzenesulfonic acid, acrylamide alkylsulfonic acid, dimethylaminopropyl(meth)acrylamide, or (meth)acrylonitrile in the presence of a cross-linking agent.

Regarding the cross-linking agent, a known cross-linking agent in the related art may be appropriately selected and used. For example, cross-linkable monomers having a polymerizable functional group such as ethylene glycol di(meth)acrylate, propylene glycol di(meth)acrylate, N,N'-methylenebis(meth)acrylamide, tolylene diisocyanate, divinylbenzene, and polyethylene glycol di(meth)acrylate; glutaraldehyde; polyhydric alcohols; polyvalent amines; polyvalent carboxylic acids, and metal ions such as calcium ions and zinc ions can be favorably used. These cross-linking agents may be used alone, or at least two types may be used in combination.

Alternatively, in the case in which the hydrophilic polymer is a cross-linked body, the cross-linked body may be a cross-linked body obtained by reacting the hydrophilic polymer that is not cross-linked, for example, polymers obtained by polymerizing the above-described monomer or polysaccharide, for example, alginic acid and hyaluronic acid; chitosan; or cellulose derivatives, for example, carboxymethyl cellulose, methyl cellulose, ethyl cellulose, and hydroxyethyl cellulose, with the above-described cross-linking agent so as to form a network structure.

There is no particular limitation regarding the molecular weight of the above-described hydrophilic polymer, and the number average molecular weight determined by GPC is preferably 3,000 or more.

There is no particular limitation regarding the ratio of the stimuli-responsive polymer to the hydrophilic polymer contained in the polymer gel of the moisture absorbing portion 2. Regarding the weight ratio excluding the weight of the cross-linking agent, the hydrophilic polymer contained relative to the stimuli-responsive polymer is more preferably 5% by weight or more and further preferably 20% by weight or more and is more preferably 1,000% by weight or less and further preferably 700% by weight or less.

Meanwhile, the moisture absorbent is not limited to the interpenetrating polymer network structure or the semi-interpenetrating polymer network structure of the stimuli-responsive polymer and the hydrophilic polymer provided that the moisture absorbent contains the stimuli-responsive polymer and the hydrophilic polymer. For example, the moisture absorbent may be a mixture or a copolymer of the stimuli-responsive polymer and the hydrophilic polymer.

(Moisture Controlling Method According to Present Embodiment)

In the moisture controlling method according to the present embodiment, the moisture absorbing portion 2 including the moisture absorbent containing the stimuli-responsive polymer with water affinity that changes reversibly in response to temperature stimuli and the heater 5 that provides temperature stimuli to degrade water affinity of the moisture absorbent are used. In this method, at least two gel sections (dehydrating and moisture absorbing gel section 3 and high-thermal-conductivity gel section 4) each with a different thermal conductivity are formed in the moisture absorbing portion 2. In this regard, absorbed moisture is released from the exposed surface 31 that is a specific region exposed outside and that is disposed on the surface opposite to the heater 5 on the basis of temperature stimuli by the heater 5.

More specifically, at least first and second gel sections (dehydrating and moisture absorbing gel section 3 and high-thermal-conductivity gel section 4) each with a different thermal conductivity are formed in the moisture absorbing portion 2. The first gel section (high-thermal-conductivity gel section 4) with higher thermal conductivity is formed so as to have a first exposed surface (exposed surface 41) that is exposed outside on the stimuli-providing portion (heater 5) side. Meanwhile, the second gel section (dehydrating and moisture absorbing gel section 3) with lower thermal conductivity is formed so as to have a second exposed surface (exposed surface 31) that constitutes the region exposed outside and that is opposite to the stimuli-providing portion (heater 5), while part of the second gel section is embedded in the first gel section (high-thermal-conductivity gel section 4).

[Outline]

The humidity controller 101 according to aspect 1 of the present invention includes the moisture absorbing portion 2 having the moisture absorbent containing the stimuli-responsive polymer with water affinity that changes reversibly in response to temperature stimuli and includes a stimuli-providing portion (heater 5) that provides temperature stimuli to degrade water affinity of the moisture absorbent, wherein the moisture absorbing portion 2 is formed to include at least two gel sections (moisture absorbing gel section 3 and high-thermal-conductivity gel section 4) each with a different thermal conductivity and to release absorbed moisture from the specific region (exposed surface 31) that is exposed outside and that is disposed on the surface opposite to the stimuli-providing portion (heater 5) in accordance with the temperature stimuli.

According to the above-described configuration, controlling the thermal conductivity in the moisture absorbing portion 2 can reduce loss due to water evaporation and efficiently release moisture from the moisture absorbing portion 2.

The humidity controller 101 according to aspect 2 of the present invention preferably has a configuration in which, in aspect 1 above, the moisture absorbing portion 2 includes at least first and second gel sections (moisture absorbing gel section 3 and high-thermal-conductivity gel section 4) each with a different thermal conductivity, the first gel section (high-thermal-conductivity gel section 4) with higher thermal conductivity has a first exposed surface (exposed surface 41) that is exposed outside on the stimuli-providing portion side, and the second gel section (moisture absorbing gel section 3) with lower thermal conductivity is formed to have a second exposed surface (exposed surface 31) that constitutes the region exposed outside and that is opposite to the stimuli-providing portion (heater 5) and is disposed such that part of the second gel section is embedded in the first gel section (moisture absorbing gel section 3).

According to the above-described configuration, heating by the stimuli-providing portion enables the moisture absorbed by the moisture absorbing portion 2 to be concentrated on the second exposed surface of the second gel section and to be released without forming a skin layer on the second exposed surface of the second gel section.

The humidity controller 101 according to aspect 3 of the present invention preferably has a configuration in which, in aspect 2 above, the first gel section (high-thermal-conductivity gel section 4) includes a first gel containing a thermally conductive filler, and the second gel section (moisture absorbing gel section 3) includes a second gel that contains a smaller amount of the thermally conductive filler than the first gel or that includes no thermally conductive filler.

According to the above-described configuration, the thermal conductivity of the first gel section and the thermal conductivity of the second gel section can be controlled relative to each other on the basis of the thermally conductive filler.

The humidity controller 101 according to aspect 4 of the present invention may have a configuration in which, in aspect 3 above, the concentration of the thermally conductive filler in the first gel section (high-thermal-conductivity gel sections 4a and 4b) is increased with increasing proximity to the stimuli-providing portion (heater 5).

According to the above-described configuration, increasing the concentration of the thermally conductive filler with increasing proximity to the stimuli-providing portion (heater 5) enables the thermal conductivity to the second gel portion (dehydrating and moisture absorbing gel section 3) to be minutely controlled.

The humidity controller 101 according to aspect 5 of the present invention may have a configuration in which, in aspects 2 to 4 above, the second gel section (moisture absorbing gel section 3d) is disposed such that the width is decreased with increasing proximity to the stimuli-providing portion (heater 5).

According to the above-described configuration, the moisture absorbed by the moisture absorbing portion 2D can be concentrated on the second exposed surface (exposed surface 31) of the second gel section (moisture absorbing section 3d) and be released without forming a skin layer on the second exposed surface (exposed surface 31) of the second gel section (moisture absorbing gel section 3d).

The humidity controller 101 according to aspect 6 of the present invention may have a configuration in which, in aspects 2 to 5 above, the moisture absorbent of the second gel section contains a hydrophilic polymer and the concentration of the hydrophilic polymer in the second gel section (moisture absorbing gel sections 3a, 3b, and 3c) relative to the stimuli-responsive polymer is decreased with increasing proximity to the stimuli-providing portion (heater 5).

According to the above-described configuration, concentration of water on the second exposed surface (exposed surface 31) is facilitated.

In the humidity controller 101 according to aspect 7 of the present invention, preferably, in aspects 2 to 6 above, the volume ratio of the first gel section (high-thermal-conductivity gel section 4) to the second gel section (moisture absorbing gel section 3) is 1:99 to 99:1.

Consequently, optimum thermal conductivity control can be realized in the moisture absorbing portion 2.

The humidity controller 101 according to aspect 8 of the present invention may have a configuration in which, in aspects 2 to 7 above, water conduit holes or hydrophilic clay mineral materials that are oriented from the stimuli-providing portion (heater 5) side toward the opposite side are inserted into the second gel section (moisture absorbing gel section 3).

Consequently, water evaporation in the second gel portion (dehydrating and moisture absorbing gel section 3) during heating by the stimuli-providing portion (heater 5) can be suppressed from occurring.

The present invention is not limited to the above-described embodiments, and various modifications within the scope of the claims can be applied. Embodiments obtained by appropriately combining technical measures disclosed in different embodiments are included in the technical scope of the present invention. Further, new technical features can be created by combining technical measures disclosed in the individual embodiments.

INDUSTRIAL APPLICABILITY

The present invention can be applied to a humidity controller that adjusts the humidity of air by using a moisture absorbing-dehydrating agent.

REFERENCE SIGNS LIST 2, 2A, 2B, 2C, 2D, 2E moisture absorbing portion
3, 3a, 3b, 3c, 3d, 3e dehydrating and moisture absorbing gel section (second gel section)
4, 4a, 4b, 4c high-thermal-conductivity gel section (first gel section)
5 heater (stimuli-providing portion)
6 water conduit hole
31 exposed surface (second exposed surface)
41 exposed surface (first exposed surface)
101 humidity controller

The invention claimed is:
1. A humidity controller comprising:
a moisture absorbing portion having a moisture absorbent containing a stimuli-responsive polymer with water affinity that changes reversibly in response to temperature stimuli; and
a stimuli-providing portion that provides temperature stimuli to degrade the water affinity of the moisture absorbent,
wherein the moisture absorbing portion is formed to include at least two gel sections each with a different thermal conductivity and to release absorbed moisture from a specific region that is exposed outside and that is disposed on an opposite side of the moisture absorb- ing portion relative to the stimuli-providing portion in accordance with the temperature stimuli, wherein the moisture absorbing portion includes at least first and second gel sections each with a different thermal conductivity, the first gel section with a higher thermal conductivity has a first exposed surface that is exposed outside on the stimuli-providing portion side, and the second gel section with a lower thermal conductivity has a second exposed surface that comprises in the region exposed outside and that is opposite to the stimuli-providing portion and is disposed such that at least a portion of the second gel section is embedded in the first gel section.

2. The humidity controller according to claim 1, wherein the first gel section includes a first gel containing a thermally conductive filler, and the second gel section includes a second gel that contains a smaller amount of the thermally conductive filler than the first gel or that includes no thermally conductive filler.

3. The humidity controller according to claim 2, wherein a concentration of the thermally conductive filler in the first gel section increases with increasing proximity to the stimuli-providing portion.

4. The humidity controller according to claim 1, wherein the second gel section is disposed such that a width decreases with increasing proximity to the stimuli-providing portion.

5. The humidity controller according to claim 1,
wherein the moisture absorbent of the second gel section contains a hydrophilic polymer, and
a concentration of the hydrophilic polymer in the second gel section relative to the stimuli-responsive polymer decreases with increasing proximity to the stimuli-providing portion.

6. The humidity controller according to claim 1, wherein a volume ratio of the first gel section to the second gel section is 1:99 to 99:1.

7. The humidity controller according to claim 1, wherein water conduit holes or hydrophilic clay mineral materials that are oriented from the stimuli-providing portion side toward the opposite side are inserted into the second gel section.

* * * * *